United States Patent [19]

Chiba et al.

[11] Patent Number: 4,761,538

[45] Date of Patent: Aug. 2, 1988

[54] METHOD AND APPARATUS FOR CONTROLLING THE TEMPERATURE OF A RADIANTLY HEATED OBJECT

[75] Inventors: Takatoshi Chiba, Muko; Hideyuki Teraoka, Kyoto, both of Japan

[73] Assignee: Dainippon Screen Mfg. Co., Ltd., Kyoto, Japan

[21] Appl. No.: 932,223

[22] Filed: Nov. 18, 1986

[30] Foreign Application Priority Data

Nov. 21, 1985 [JP] Japan .................................. 60-259907
Dec. 11, 1985 [JP] Japan .................................. 60-276986
Jan. 8, 1986 [JP] Japan .................................. 61-002549

[51] Int. Cl.$^4$ ............................................. H05B 1/02
[52] U.S. Cl. ..................................... 219/497; 219/505; 219/494; 219/358; 340/588; 307/117
[58] Field of Search ............... 219/490, 492, 494, 497, 219/499, 501, 216, 505, 507, 358; 340/588, 589; 323/235, 236, 319; 307/117

[56] References Cited

U.S. PATENT DOCUMENTS

| | | | |
|---|---|---|---|
| 4,300,037 | 11/1981 | Padden | 219/492 |
| 4,340,807 | 7/1982 | Raskin et al. | 219/497 |
| 4,377,739 | 3/1983 | Eckert, Jr. et al. | 219/216 |
| 4,551,007 | 11/1985 | Elter | 219/497 |
| 4,570,054 | 2/1986 | Chigzey et al. | 219/490 |

Primary Examiner—M. H. Paschall
Attorney, Agent, or Firm—Lowe, Price, LeBlanc, Becker & Shur

[57] ABSTRACT

A temperature control signal ($S_1$) responsive to a target temperature is biquadrated ($S_1^4$) to produce a power control signal. A power supply unit supplies electric power to one or more radiant heat sources on the basis of the power control signal, whereby an object such as, for example, a wafer is heated by radiant energy from the one or more radiant heat sources. The wafer temperature is proportional to the biquadrative root of the radiant energy in accordance with the well-known Stefan-Boltzmann's law, whereby the wafer temperature correctly follows a predetermined time-dependent target temperature variation over time.

19 Claims, 20 Drawing Sheets

(PRIOR ART)

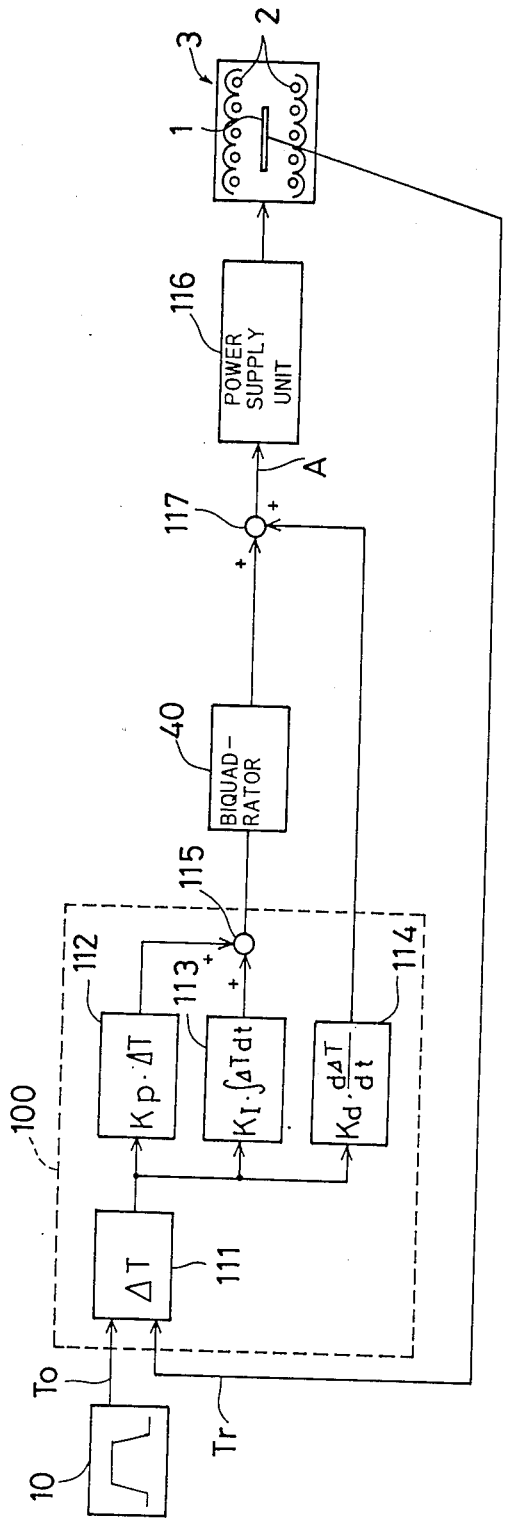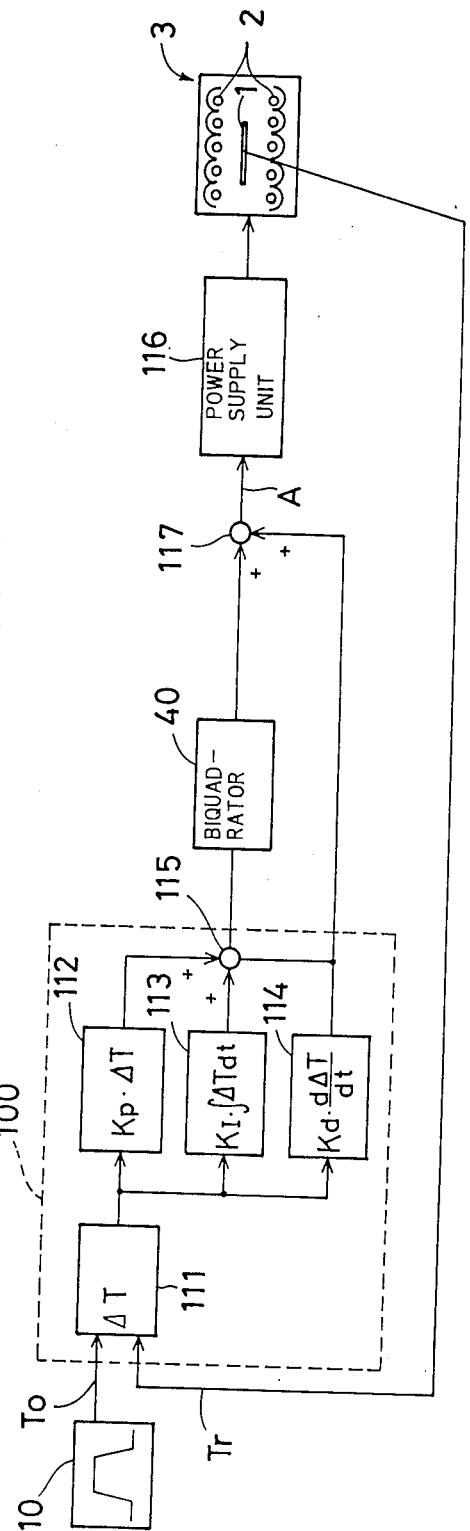

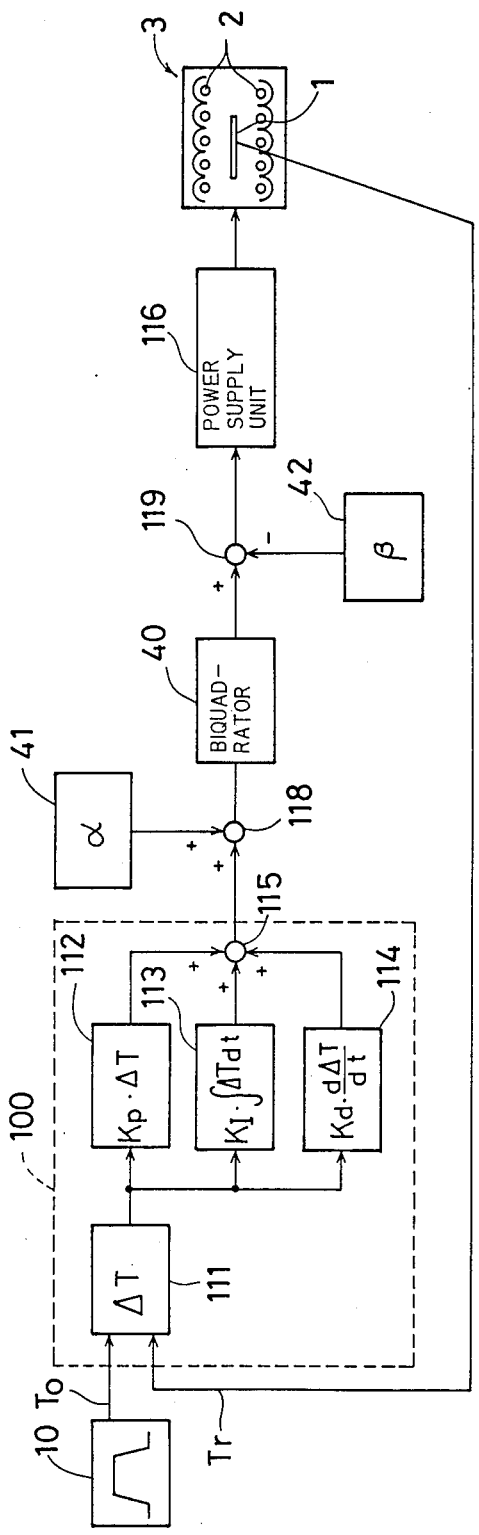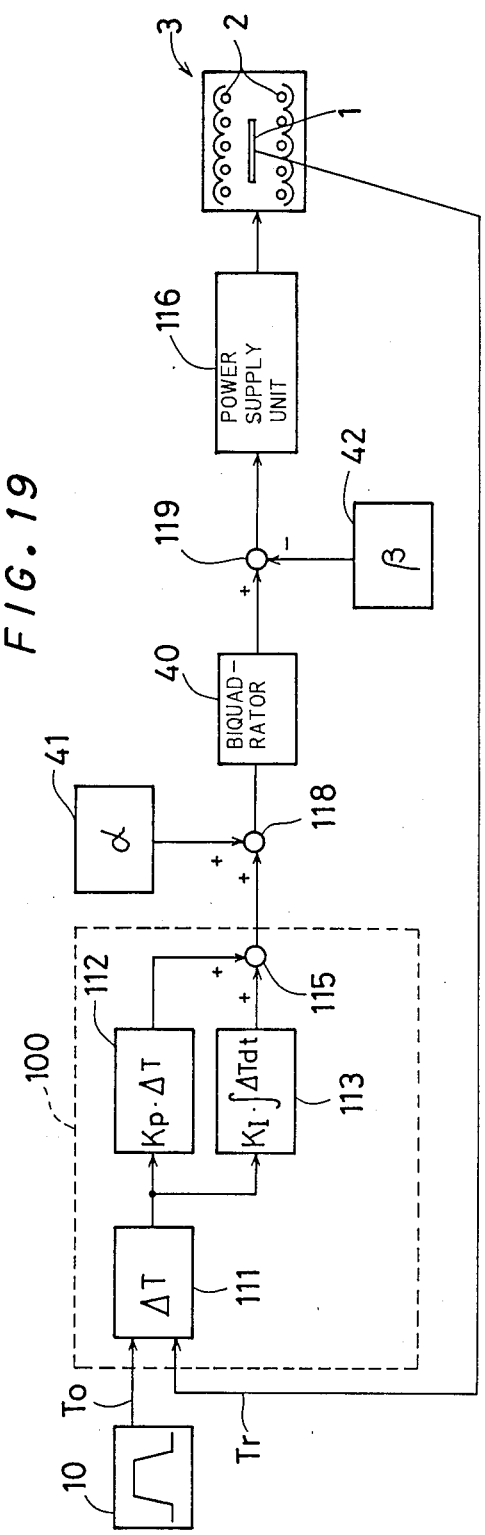

FIG. 28
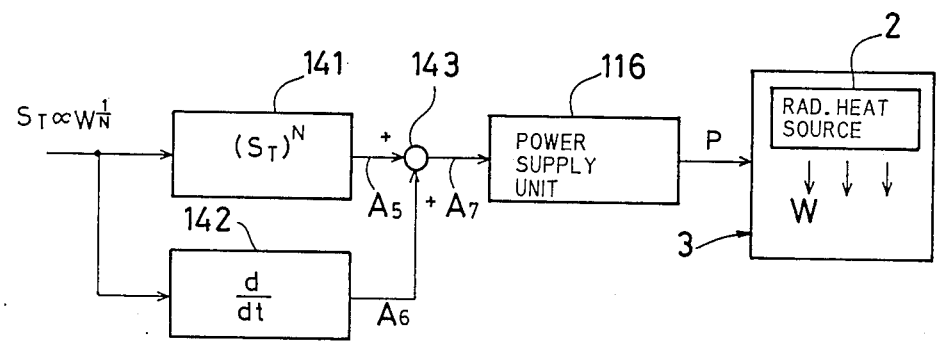
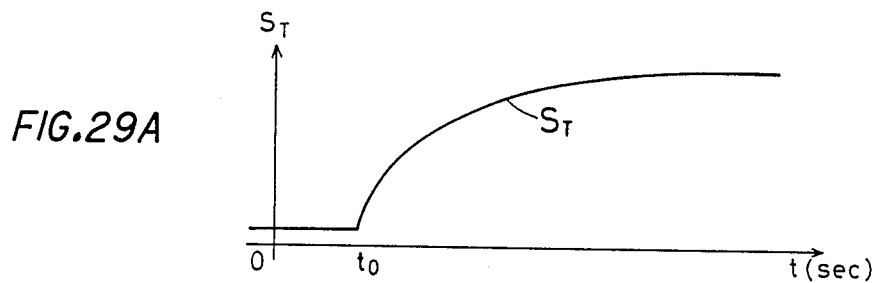
FIG.29A
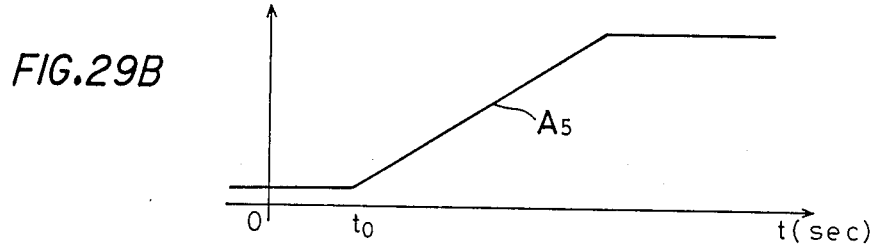
FIG.29B
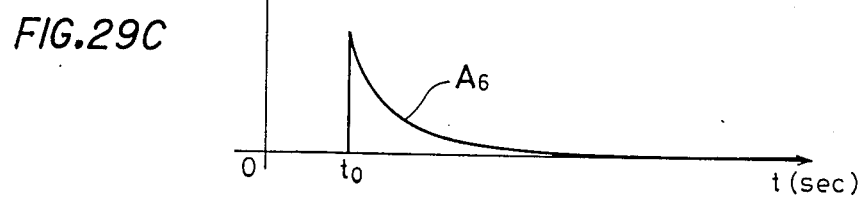
FIG.29C
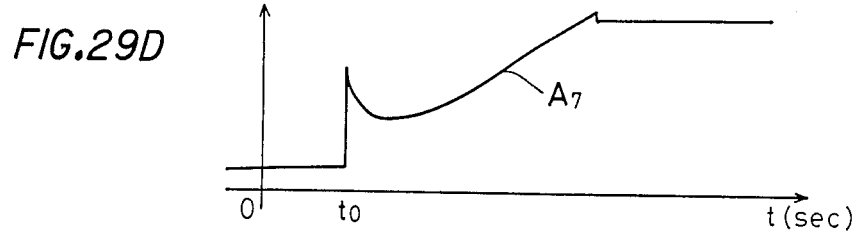
FIG.29D

METHOD AND APPARATUS FOR CONTROLLING THE TEMPERATURE OF A RADIANTLY HEATED OBJECT

BACKGROUND OF THE INVENTION

1. Field of the Invention

The present invention relates to a temperature control method and apparatus therefor, suitable for controlling the heating of an object such as a semiconductor substrate (hereinafter referred to as "wafer") in a heating furnace provided with radiant heat sources.

2. Description of the Prior Art

In the process of manufacturing a semiconductor device, heat treatment is applied to a wafer to achieve several objects, such as uniformity of composition in ion implantation layers, stabilization of silicon films, and formation of ohmic contacts. In such heat treatment, the wafer must be rapidly and uniformly heated according to a predetermined target temperature variation over time. After the temperature of the wafer reaches a target heat treatment level, the wafer must be maintained at that temperature.

Typically, a heating furnace provided with radiant heat sources such as strong halogen lamps is employed for such heat treatment of a wafer or the like. Feedback control is provided, in which the temperature in the heating furnace is detected and any deviation between the detected temperature and a target temperature value is calculated, whereby the amount of electric power supplied to the radiant heat sources is controlled so as to decrease the deviation.

FIG. 1 is a block diagram illustrating a conventional prior art heat treatment apparatus employing such a temperature control method. Referring to FIG. 1, a wafer 1 to be heated is introduced into a heating furnace 3 provided on both sides of inner surfaces thereof with a plurality of radiant heat sources 2, and the wafer 1 is supported by a wafer supporting mechanism 4.

On the other hand, at a target temperature setter 10, a trapezoidal target temperature change curve $F_1(T_0)$, as illustrated in FIG. 2, is previously set as a function of time t. Referring to FIG. 2, the temperature is expressed in a scale of absolute temperature [K], and symbol $T_p$ indicates the stationary treating temperature. A target temperature signal $T_0$ outputted from the target temperature setter 10 in FIG. 1 in response to the target temperature change curve $F_1(T_0)$ is supplied to a subtracter 11 with an actual temperature signal $T_r$ detected by a temperature detector 5 such as a thermocouple provided in the heating furnace 3.

The subtracter 11 obtains deviation $\Delta T$ between $T_0$ and $T_r$ by the following expression (1), to output a deviation signal $\Delta T$ to multipliers 13 to 15 in a PID controller 12:

$$\Delta T = T_0 - T_r \tag{1}$$

The multiplier 13 multiplies the deviation $\Delta T$ by a constant $K_1$ to provide a deviation proportional signal $S_p$. The multiplier 14 multiplies the deviation $\Delta T$ by a constant $K_2$ and the product thus obtained is integrated with time in an integrator 16 of a subsequent stage, thereby to provide a deviation integrated signal $S_I$. The multiplier 15 multiplies the deviation $\Delta T$ by a constant $K_3$ to differentiate the product by time in a differentiator 17 of a subsequent stage, thereby to provide a deviation differentiated signal $S_D$. These signals $S_p$, $S_I$ and $S_D$ are added up by an adder 18, to provide a temperature control signal $S_T$.

The temperature control signal $S_T$ is supplied to a power supply unit 19 for supplying electric power P to the radiant heat sources 2. The power supply unit 19 is provided with a power controller 21 and a power source 20. The temperature control signal $S_T$ is inputted in the power controller 21, which controls the electric power P supplied from the power source 20 to the radiant heat sources 2 to be proportional to the temperature control signal $S_T$. Thus, the temperature control signal $S_T$ itself functions as a power control signal in such a conventional apparatus.

Thus, radiant energy from the radiant heat sources 2 is increased or decreased in response to the deviation $\Delta T$, to control the temperature of the wafer 1 along the target temperature change curve $F_1(T_0)$.

In such a conventional temperature control method, however, the temperature in the heating furnace 3 cannot effectively respond to a drastic rise in the target temperature. This problem is now described in further detail with reference to FIG. 3.

In FIG. 3, the left half of FIG. 2 is shown enlarged, to illustrate respective time change curves $F_2(T_r)$ and $F_3(P)$ of the actual temperature $T_r$ in the heating furnace 3 and the supplied electric power P. As is obvious from FIG. 3, when the target temperature $T_0$ drastically rises, and the temperature in the heating furnace 3 must be rapidly raised, for example, from a range of 200° C. to 300° C. to more than 1000° C. in several seconds, a considerable time is required until the actual temperature $T_r$ in the heating furnace 3 reaches the stationary treating temperature $T_p$ and is stabilized at that level. Thus, it is difficult to accurately perform a desired heat treatment.

In order to solve the problem, the constants $K_1$, $K_2$ and $K_3$ corresponding to feedback gains may be increased. However, in this method, the actual temperature $T_r$ may overshoot or hunt around at time $t_1$ (FIG. 3) at which the temperature control process advances from a temperature increasing step to a temperature maintaining step. Thus, the aforementioned problems cannot be adequately solved by such a method.

Futhermore, in the conventional method, temperature control is performed on the premise that substantially all of the electric power P supplied to the radiant heat sources 2 is converted into radiant heat. Such a premise is not true as hereinafter described, and leads to errors in exercising temperature control of the wafer in the temperature increasing step.

The aforementioned problems are not restricted only to heat treatment of wafers, but are often encountered in controllably heating arbitrary objects by radiant heat sources.

SUMMARY OF THE INVENTION

The present invention is directed to a temperature control method for supplying electric power from power supply means to radiant heater means to heat an object by radiant energy provided by the radiant heater means, thereby to control the temperature of an object to follow a prescribed target temperature value over a specific period.

The temperature control method according to the present invention comprises the steps of: obtaining a relationship between electric power supplied to radiant heater means and the temperature of an object on the basis of a correlation between the amount of radiant heat supplied and the temperature of the heated object; generating a temperature control signal responsive to a target temperature; converting the temperature control signal into a power control signal for controlling electric power supplied to the radiant heater means in accordance with a conversion rule determined in response to the said relation; and supplying said electric power from power supply means to the radiant heater means on the basis of a power supply signal thereby to control heating of the object by radiant energy from the radiant heater means.

According to a preferred embodiment of the present invention, the conversion rule is determined on the basis of Stefan-Boltzmann's law with respect to the relationship between temperature and radiant energy. The conversion may include a process of raising the temperature control signal S to a mathematical power other than 1, e.g., $S^N$, where $N \neq 1$.

Such a mathematical power operation is preferably performed after a prescribed first constant is added to the temperature control signal, and the power control signal is obtained by subtracting a prescribed second constant from the result of the mathematical power operation.

A temperature control method for supplying electric power to control the temperature of a radiantly heated body according to a prescribed target temperature variation over time according to an aspect of the present invention comprises the steps of: obtaining a relationship between electric power supplied to a radiant heater means and the temperature of an object heated thereby; generating a temperature control signal responsive to said prescribed target temperature; converting said temperature control signal into a power control signal for controlling electric power; and supplying the electric power to a radiant means on the basis of the power control signal.

According to this embodiment, a heating error caused by the thermal capacity of the radiant heater means itself is effectively prevented.

The present invention is also directed to a temperature control apparatus for heating an object by controlling the temperature of the object to follow a prescribed target temperature level over time. The temperature control apparatus according to the present invention comprises: (a) a temperature control signal generator means for generating a temperature control signal responsive to a target temperature, (b) radiant heater means for heating the object by radiant energy, (c) power supply means for supplying electric power to the radiant heater means itself, (d) signal conversion means for converting the temperature control signal to a power control signal for controlling electric power to be supplied to the radiant heater means in accordance with a conversion rule previously obtained in response to a relation between the electric power supplied to the radiant heater means and the temperature of the object, and (e) transmission means for transmitting the power control signal to the power supply means.

In the prior art, the temperature control signal obtained by performing the PID processing on the temperature deviation ΔT is directly inputted to the power supply means as the power control signal without consideration of the relationship between the temperature of the object and the supplied electric power P in detail, as hereinabove described. Furthermore, the power supply means supplies electric power proportional to the temperature control signal to the radiant heat sources, i.e., radiant heater means. However, since the temperature of an object in a thermal equilibrium state generally is not proportional to the supplied power, the temperature of the object such as a wafer is not proportional to the temperature control signal in the prior art, leading to the aforementioned problems.

According to the present invention, the relationship between the supplied electric power and the actual temperature $\theta$ of the object, which is expressed by the following expression (2), is previously obtained as a functional expression or numerical data on the basis of correlations between radiant energy I from radiant heat sources and the temperature $\theta$ of the object in a thermal equibrium state or thermal non-equibrium state:

$$P = f(\theta) \qquad (2)$$

The temperature control signal is converted into the power control signal on the basis of the aforementioned relation, thereby to perform temperature control. However, it is dispensable to directly detect the temperature $\theta$ of the object itself. When, for example, a closed heating furnace or the like is employed, the object temperature may be indirectly or approximately obtained from the furnace temperature or the like.

Accordingly, an object of the present invention is to provide a temperature control method and an apparatus therefor which can make the temperature of an object responsive to change in target temperature value, accurately and at a high speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a block diagram of a heat treatment apparatus according to a fifth embodiment of the present invention;

FIG. 17 is a block diagram of a modification of the fifth embodiment;

FIG. 18 is a block diagram of a heat treatment apparatus according to a sixth embodiment of the present invention;

FIG. 19 is a block diagram of a modification of the sixth embodiment;

FIG. 28 is a partial block diagram of a heat treatment apparatus according to a ninth embodiment of the present invention; and FIGS. 29A to 29D are graphs of waveforms relating to the ninth embodiment.

DESCRIPTION OF THE PREFERRED EMBODIMENTS

A. Principle of the Preffered Embodiments

Before detailed structure and operation of preferred embodiments are described, a control principle of the preferred embodiments is now described by employing a heat treatment of a wafer as an example. For this purpose, the expression (2) is now developed into a practical form.

Figure 4:
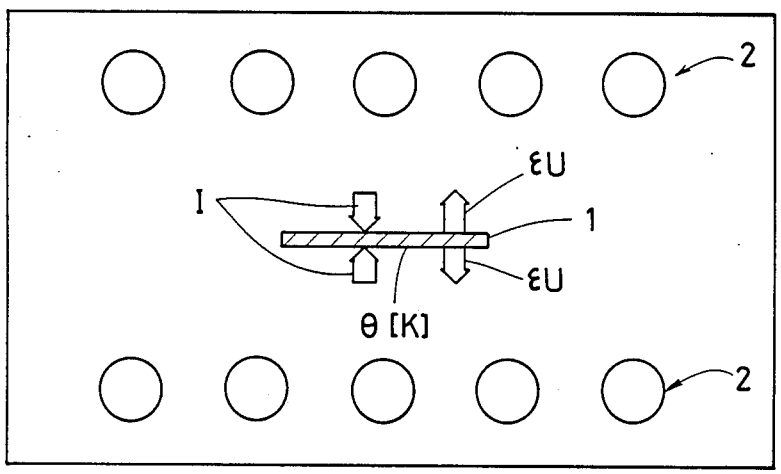
FIG. 4 is a conceptual view of the interior of a heating furnace 3.
Figure 5:
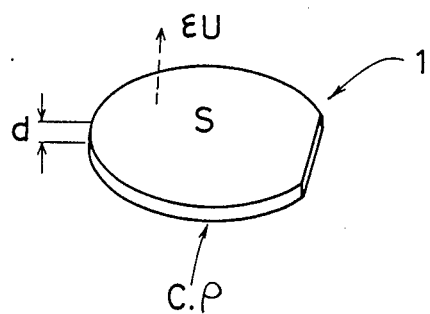
FIG. 5 is a perspective view of a wafer.

FIG. 4 conceptually illustrates the internal structure of the heating furnace 3, as hereinabove described with reference to FIG. 1. Referring to FIG. 4, symbol I indicates the irradiation strength of radiant energy from the radiant heat sources 2 from both sides, to the wafer 1 per unit area, and the symbol $\theta$ [K] indicates the absolute temperature (in °K.) of the wafer 1. Other symbols related to wafer 1 are defined as follows, as shown in FIG. 5:

S . . . Area of upper or lower surface
d . . . Thickness
c . . . Specific heat
$\rho$ . . . Density
$\epsilon$ . . . Emissivity
I . . . Total radiant energy, arriving from both sides of the irradiated object, per unit area thereof It is assumed that all of the radiant energy I irradiated on the wafer 1 is absorbed by wafer 1. Thus, the total quantity of heat supplied from the radiant heat sources 2 to wafer 1 within a small time $\Delta t$ is ($\epsilon S I \Delta t$), from both sides together. On the other hand, the quantity of heat dissipated from the wafer 1 during this time is ($2\epsilon S U \Delta t$) assuming that symbol U represents radiant energy per unit area of a black body of the temperature $\theta$ [K].

Therefore, the wafer 1 stores a quantity $\Delta Q$ of heat, which is the difference between the supplied energy and dissipated energy:

$$\Delta Q = \epsilon S (I - 2U) \Delta t \qquad (3)$$

If the temperature of the wafer 1 is increased by $\Delta\theta$, by acquisition of the heat quantity $\Delta Q$, the following expression (4) is obtained since the thermal capacity of the wafer 1 is ($\rho$ cdS):

$$(\rho cdS)\Delta\theta = \epsilon S(I-2U)\Delta t \qquad (4)$$

Therefore, in the limit, as t→0, the following expression (5) is obtained in differential form:

$$I = \frac{\rho cd}{\epsilon} \cdot \frac{d\theta}{dt} + 2U \qquad (5)$$

However, the radiant energy U of the black body is proportional to the fourth power of the absolute temperature $\theta$ thereof, by the well-known Stefan-Boltzmann's law:

$$U = \sigma \theta^4 \qquad (6)$$

where symbol $\sigma$ represents a constant, which is given through Boltzmann's constant $k_B$, the velocity of light $c_l$ and Planck's constant h, as follows:

$$\sigma = 2\pi^5 k_B^4 / 15 c_l^2 h^3 \qquad (7)$$

Assuming that $\gamma$ represents the ratio of radiant energy intensity I to supplied electric power P at the radiant heat sources 2, i.e., the radiant efficiency, the following equation (8) is obtained $$I = \gamma P \qquad (8)$$

Therefore, the following expression (9) is obtained by using the expressions (5), (6) and (8):

$$P = \frac{\rho cd}{\gamma \epsilon} \cdot \frac{d\rho}{dt} + \frac{2\sigma}{\gamma} \theta^4 \qquad (9)$$

This expression (9) corresponds to the expression (2) in this embodiment.

According to the expression (9), the radiant heat sources 2 must be supplied with electric power P obtained by setting $\theta = T_0$ in the right side of expression, in order to coincide the temperature $\theta$ of the wafer 1 with the target temperature $T_0$. Therefore, a control circuit in this embodiment is also designed in accordance with expression (9).

The expression (9) is actually an approximation. More correctly, an additive term g may be included as shown in the following expression (10):

$$P = \frac{\rho c d}{\gamma \epsilon} \cdot \frac{d\theta}{dt} + \frac{2\sigma}{\gamma} \theta^4 + g \quad (10)$$

Such a term g allows, for example, for the thermal capacity of the filaments (resistors) of the radiant heat sources 2 themselves and for outward heat dissipation from the heating furnace. A control including the additive term g is described hereinafter.

B. First Embodiment

Figure 6:
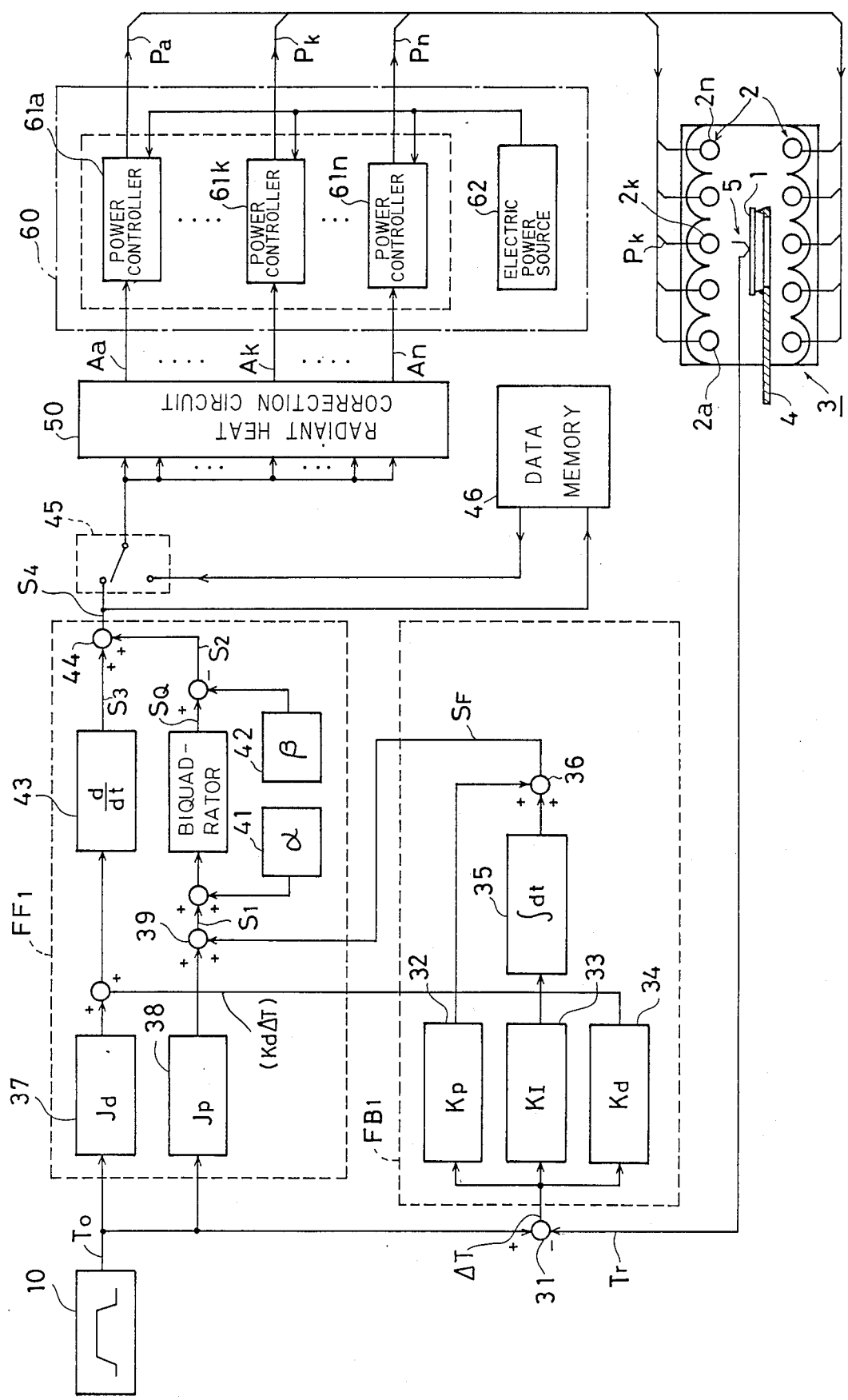
FIG. 6 is a block diagram of a heat treatment apparatus for a wafer according to a first preferred embodiment of the present invention.

FIG. 6 is a block diagram showing a heat treatment apparatus for a wafer employing a temperature control method according to a preferred embodiment of the present invention. This embodiment is formed as a control apparatus including a feedforward control system $FF_1$ and a feedback control system $FB_1$ Referring to FIG. 6, the target temperature change curve as shown in FIG. 2 is previously set at a target temperature setter 10, similarly to the conventional type shown in FIG. 1. A target temperature signal $T_0$ from the target temperature setter 10 is inputted to a subtracter 31 with an actual temperature signal $T_r$ from a temperature detector 5 provided on the surface of a wafer 1 in a heating furnace 3. The subtracter 31 calculates according to the following expression (11) and outputs a deviation signal T for feedback control:

$$\Delta T = T_0 - T_r \quad (11)$$

This procedure is similar to that of the conventional apparatus.

The deviation signal $\Delta T$ thus obtained is inputted to multipliers 32, 33 and 34, to be multiplied by $K_P$, $K_I$ and $K_d$, respectively. The output from the multiplier 32 corresponds to a proportional control signal in PID control. The output from the multiplier 33 is integrated in an integrator 35 to form an integral control signal. These signals are added by an adder 36.

Figure 1:
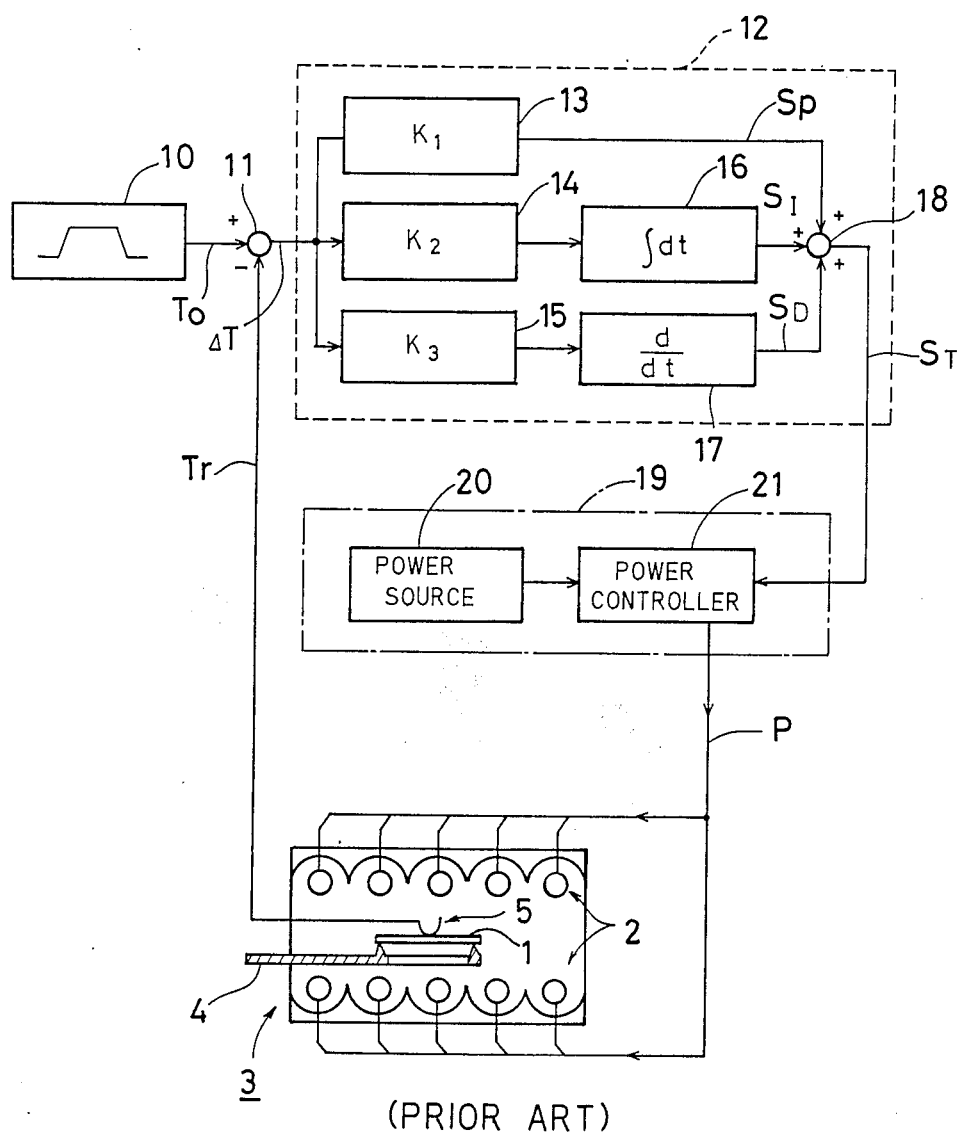
FIG. 1 is a block diagram illustrating an example of prior art apparatus for heat treatment of a wafer employing a conventional temperature control method.
Figure 2:
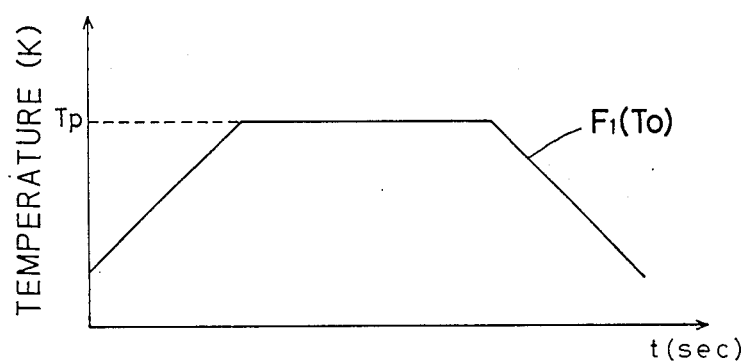
FIG. 2 is a graph showing an example of a target temperature vs. time curve according to the prior art.

On the other hand, the multiplication by $K_d$ in the multiplier 34 corresponds to multiplication of a gain in a multiplier 15 in the prior art apparatus shown in FIG. 1 prior to obtaining a differential control output $S_D$. The output from the multiplier 34 is supplied to the feedforward control system $FF_1$ without being added in the adder 36 as in the conventional case. This is because the time differentiation of the temperature ($d\theta/dt$) is present in the expression (9) for the supplied power P as a term independent of the term $\theta^4$, and hence it is preferable to handle ($dT_0/dt$) corresponding thereto in a separate manner.

The target temperature signal $T_0$ from the target temperature setter 10 is also supplied to multipliers 37 and 38 in the feedforward control system $FF_1$. The multiplier 38 multiplies the target temperature signal $T_0$ by a gain $J_p$. A signal thus obtained is supplied to an adder 39 to be added up with feedback output $S_F$ from the feedback control system $FB_1$. Thus, the output $S_1$ from the adder 39 is a signal obtained by correcting the target temperature signal $T_0$ as the basis for feedforward control by the feedback signal $S_F$ responsive to the temperature deviation $\Delta T$.

A predetermined constant $\alpha$ supplied from a constant setter 41 is added to the signal $S_1$, and the result of this addition is biquadrated (i.e., raised to the fourth power) by a biquadrator 40. Then a constant $\beta$, from another constant setter 42, is subtracted from the biquadrated signal to produce a signal $S_2$, which is supplied to an adder 44. The meaning of these constants $\alpha$ and $\beta$ is described hereinafter.

The multiplier 37 multiplies the target temperature signal $T_0$ by a factor $J_d$. Then a signal ($K_d\Delta T$), from the multiplier 34 in the feedback control system $FB_1$, is added to the multiplied signal ($J_dT_0$). The signal thus obtained is time-differentiated by a differentiator 43. This differential signal $S_3$ is added to the output $S_2$ from the biquadrator 40 in an adder 44, to produce a signal $S_4$ which is transmitted to a power supply unit 60 through a circuit described in the following.

One feature of the temperature control apparatus according to the present invention resides in the aforementioned biquadrative operation. Specifically, the temperature control signal $S_1$, obtained on the basis of the target temperature $T_0$, is converted into a more competent control signal $S_Q$ in consideration of the correspondence between the electric power P supplied to the radiant heat sources and the actual temperature $T_r$ of the heated object, i.e., the wafer 1.

As described, the signals $S_2$ and $S_3$ are added to produce the signal $S_4$, which is supplied to the power supply unit 60. Within the said signals, the signal $S_2$ is obtained by applying a deviation correction $\Delta T$ and a biquadrative correction to the target temperature $T_0$. The signal $S_3$ is obtained by applying a deviation correction and differentiation processing to the target temperature $T_0$. Therefore, the aforementioned structure implements a circuit for supplying electric power P in accordance with expression (9). Thus, the temperature control signal $S_1$ is converted into the control signal $S_Q$ to obtain a power control signal as hereinafter described, so that the actual temperature $T_r$ of the heated object, e.g., wafer 1, correctly follows the target temperature $T_0$ over time.

The meaning of the constants $\alpha$ and $\beta$ is now clarified. The target temperature $T_0$ outputted from the temperature setter 10 is provided as the absolute temperature, which can be set at any level within a range $T_0 \geq 0[K]$. As described, the biquadrative processing in the biquadrator 40 is performed on the basis of the Stefan-Boltzmann's law, which also holds for temperatures from 0[K] on. Thus, the biquadrative processing is suitable for carrying out the wafer heating process from an initial state in which the temperature in the heating furnace 3 is, in theory, 0[K]. Therefore, when the biquadrative processing is performed on the target temperature $T_0$, to directly supply the signal to the power supply unit 60, the electric power is supplied to the radiant heat sources 2 on the assumption that the temperature in the heating furnace 3 is initially 0[K].

In heat treatment of a wafer, however, the furnace temperature in general is retained at about 100° C. to 400° C. (hereinafter referred to as $T_n$) from the initial stage. Therefore, it is not necessary to heat the furnace to raise its temperature from 0[K] to $T_n$[K], but the supply of electric power is required substantially to increase the furnace temperature to a value exceeding $T_n$.

In this embodiment, therefore, not only is the relation between the target temperature $T_0$ and the supplied electric power P corrected by the biquadrative processing in accordance with the Stefan-Boltzmann's law, but the origin of the biquadrative processing is shifted, in the biquadrator 40, in order to cope with the aforementioned condition. In other words, the signal obtained by adding the constant $\alpha$ to the output from the adder 39 is biquadrated and then the constant $\beta$ is subtracted from the biquadrated signal to output the resulting signal. The constants $\alpha$ and $\beta$ are previously set in constant setters 41 and 42, respectively.

When no addition and subtraction of these constants $\alpha$ and $\beta$ are performed, the relation between the input $S_1$ and the output $S_2$ is as follows:

$$S_2 = (S_1)^4 \tag{12}$$

On the other hand, when addition and subtraction of $\alpha$ and $\beta$ are performed, the relation is:

$$S_2 = (S_1 + \alpha)^4 - \beta \tag{13}$$

Thus, the origin of the biquadrative processing is shifted to $(\alpha, \beta)$ by the aforementioned addition and subtraction. Therefore, the constants $\alpha$ and $\beta$ are appropriately set to enable correction for the fact that the initial temperature in the heat treatment is not 0[K].

Figure 7A:
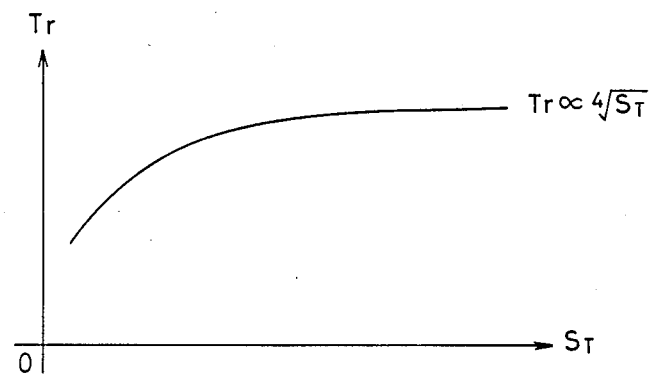
FIGS. 7A to 7C are explanatory diagrams illustrating correction by constants α and β according to the prior art.
Figure 7B:
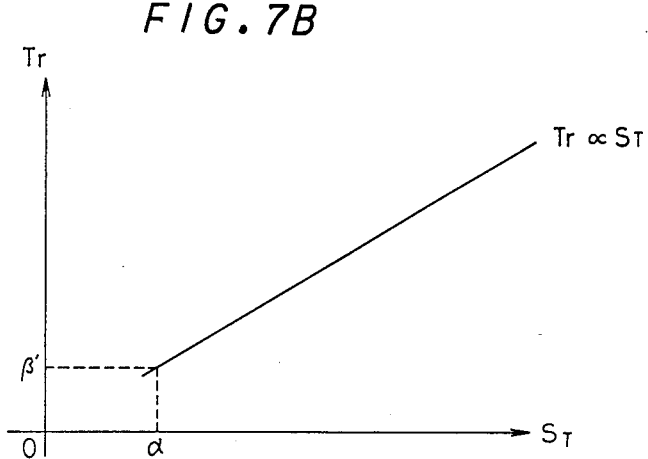
Figure 7C:
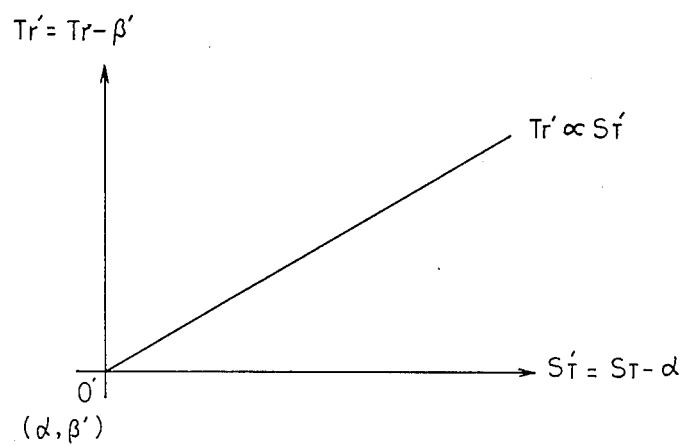

FIGS. 7A to 7C facilitate an understanding of such a situation. FIG. 7A corresponds to the conventional temperature control method, and the temperature $T_r$ of the wafer 1 is proportional to the fourth root of a temperature control signal $S_T$ (e.g., the signal $S_1$). FIG. 7B corresponds to the case of performing only a biquadrative correction, and the temperature $T_r$ is proportional to the temperature control signal $S_T$. FIG. 7C shows the case of performing the biquadrative correction and the correction obtained through the constants $\alpha$ and $\beta$, and, with respect to a variable $(S_T', T_r') = (s_T - \alpha, T_r - \beta')$ having its origin $O'$ at $(S_T, T_r) = (\alpha, \beta')$, the characteristic is in the form of a straight line starting from the origin $O'$. The constant $\beta'$ represents a variation in the wafer temperature $T_r$ caused by subtracting the constant from the control signal $S_Q$.

As is obvious from FIG. 7C, the wafer temperature $T_r$ rises from the level $\beta'$ upon rise of the temperature control signal from the level $\alpha$ by a correction through $\alpha$ and $\beta$.

For example, the value of the room temperature in absolute units [K] is employed as the constant $\alpha$, and the value of the power control signal $S_2$ required for providing the value is employed as the constant $\beta$. A control circuit so implemented is suitable for an actual temperature control range. Another example is hereinafter described with respect to such a correction using $\alpha$ and $\beta$.

Figure 8:
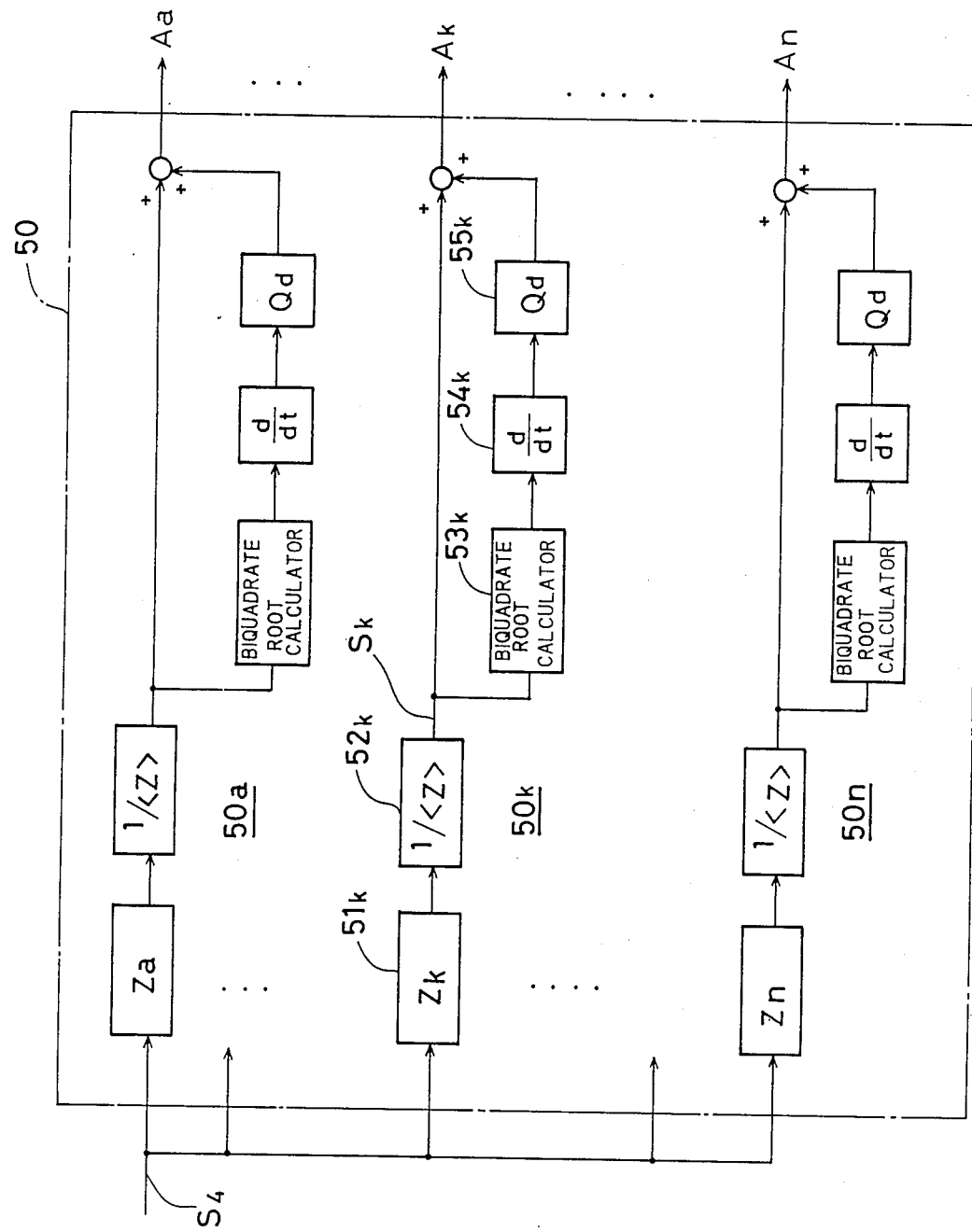
FIG. 8 is a block diagram of the internal structure of a radiant heat correcting circuit.

The power control signal $S_4$ thus obtained is stored in a data memory 46 in FIG. 6 as well as being supplied to a radiant heat correction circuit 50 through a switch 45. The radiant heat correction circuit 50 is adapted to correct the electric power P supplied to the radiant heat source 2 upon a change in the target temperature $T_0$, in consideration of the electric power required for heating the radiators (resistors) in the radiant heat sources 2 themselves, and details thereof are shown in FIG. 8. The radiant heat correction circuit 50 and a power supply unit 60 comprises pluralities of respective internal circuits in correspondence to a plurality of unit radiant heat sources $2a, \ldots, 2n$ forming the radiant heat sources 2. This is because the unit radiant heat sources actually facing the wafer 1 in the heating furnace 3 are different from the others in the thermal influence they have on the heated wafer 1.

Referring to FIG. 8, description is now provided of a k-th unit correction circuit 50k within n unit correction circuits $50a, \ldots, 50n$ included in the radiant heat correction circuits 50. Assuming that the resistor of the unit radiant heat source $2k$ corresponding to the unit correction circuit $50k$ has a thermal capacity $C_d$ and a temperature $\theta$, the electric power required to change the temperature of that resistor is proportional to:

$$C_d d\theta/dt \tag{14}$$

The respnsiveness of the resistor is further improved when the following electric power $P'_k$, obtained by adding the amount of expression (14) to electric power $P_k$ assigned to the unit radiant heat source $2k$ from the electric power P of the expression (9), is supplied to the unit radiant heat source $2k$:

$$P'_k = P_k + L_k C_d (d\theta/dt) \tag{15}$$

where $L_k$ represents a constant.

This corresponds to an example of the additive term g in the expression (19). The constant $L_k$ in the expression (15) is is different for each unit radiant heat source depending on that relationship of that heat source to the wafer 1 and the geometry of the heating furnace 3.

As hereinabove described, the energy radiated from the object of the temperature $\theta$ is provided by the Stefan-Boltzmann's law, i.e., expression (6). Therefore, assuming that the radiant energy is proportional to the electric power P, an expression corresponding to the expression (6) is solved such that the second term in the right side of expression (15) is proportional to the following value:

$$\sqrt[4]{P} \tag{16}$$

Therefore, assuming that $Z_k$ and $Q_d$ are coefficients experimentally determined as optimum values, it is preferred to calculate the value $S_k$ defined by the expression (17) and to employ a corrected power control signal $A_k$ defined by the expression (18) for controlling electric power supplied to the radiant heat sources 2.

$$S_k = S_4(Z_k/<Z>) \tag{17}$$

$$A_k = S_k + Q_d \tag{18}$$

Where the coefficient $Z_k$ represents power distribution in percentage units. The symbol $<Z>$ represents the average value of $Z_a$ to $Z_n$, and it is employed for normalization.

The unit correction circuit $50k$ as shown in FIG. 8 is structured in accordance with the above-discussed principle, and the input $S_4$ is multiplied by $Z_k$ in a multiplier $51k$ and is then multiplied by $1/<Z>$ in a multiplier $52k$. The output $S_k$ is supplied to a biquadrate root calculator $53k$ to produce a biquadrate root signal $\sqrt[4]{S_k}$, which is time-differentiated by a differentiator $54k$. The differentiated signal is multiplied by a coefficient $Q_d$ in a multiplier $55k$. The value thus obtained is added to the output from the multiplier $52k$, to produce the corrected power control signal $A_k$. The corrected power control signal $A_k$ is transmitted to a power controller $61k$ provided in the power supply unit 60, shown in FIG. 6. This also applies to the other unit correction circuits $50a, \ldots, 50n$, shown in FIG. 8.

Thus, the power controllers $61a, \ldots, 61n$ supply separate electric power flows $P_a, \ldots, P_n$ from an electric power source 62 to the individual unit radiant heat sources $2a, \ldots, 2n$, in response to the corrected power control signals $A_a, \ldots A_n$ respectively. The unit radiant heat sources $2a, \ldots, 2n$ generate radiant heat on the basis of the respective electric power flows $P_a, \ldots P_n$ to them, thereby to controllably heat the wafer 1. It is to be noted that $P_a + \ldots + P_n = P$.

According to this embodiment, the wafer 1 is provided on its surface with the temperature detector 5 of a contact type, and hence it is not preferable to perform heat treatment on the wafer 1 for a product while driving the aforementioned control loop. In this embodiment, therefore, a dummy wafer is employed as the wafer 1 with provision of the aforementioned temperature detector 5, to experimentarily perform the desired heat treatment thereby to determine optimum values of various constants. At the same time, the optimum values of control signals $S_4$ are stored in the data memory 46.

In order to perform heat treatment on a product wafer provided with no temperature detector 5, the switch 45 is connected to the data memory 46 and control signals $S_4$ from the data memory 46 are read out. The signals $S_4$ are transmitted to the corresponding power controllers 61a to 61h, thereby to perform the desired temperature control in heat treatment of the product wafer.

However, no such problem is caused when a non-contact type temperature detector is provided in the vicinity of the wafer, and hence the control loop can be driven thereby in heat treatment of the product wafer in this case.

C. Second Embodiment

Figure 9:
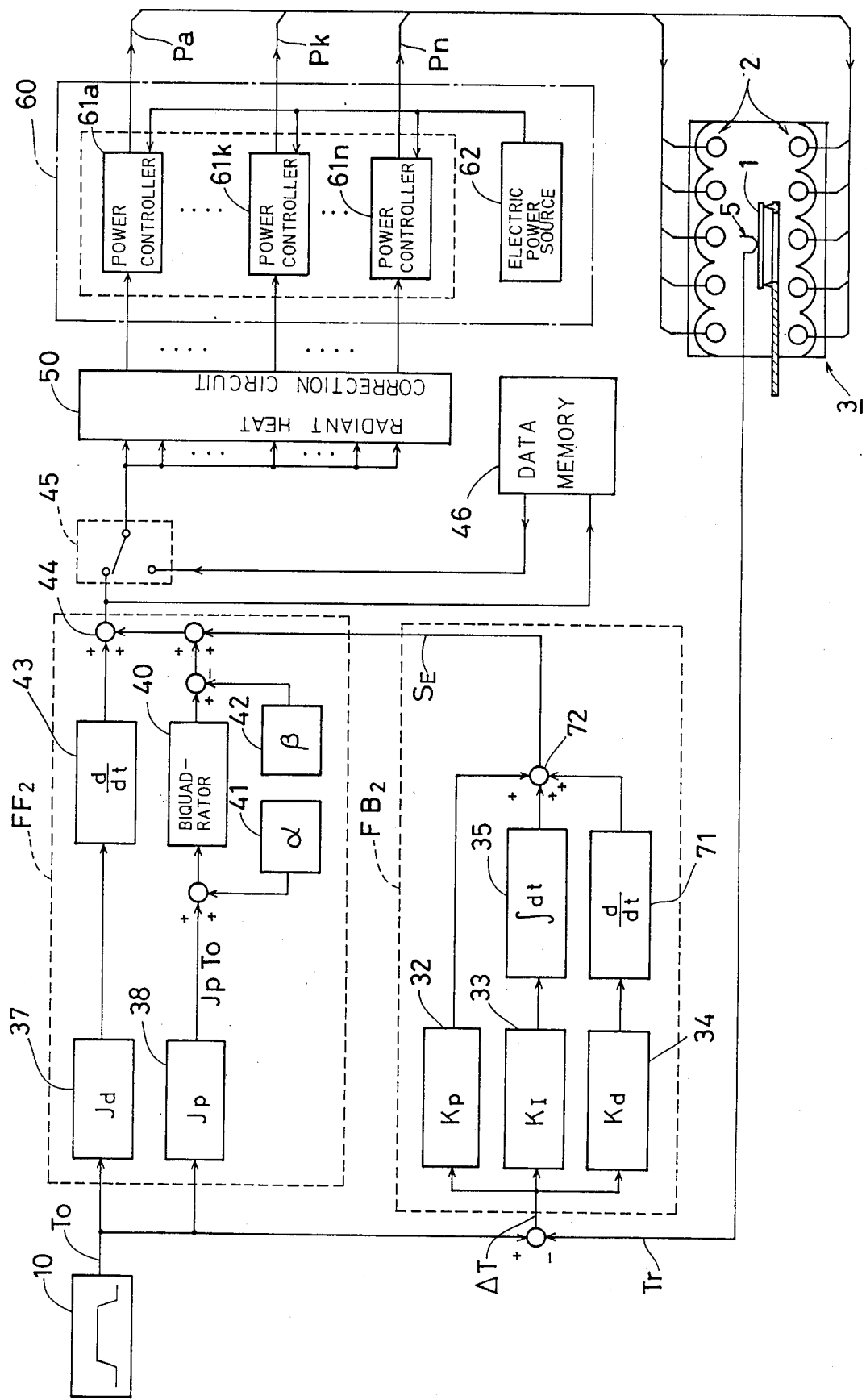
FIG. 9 is a block diagram of a heat treatment apparatus according to a second emobodiment of the present invention.

FIG. 9 is a block diagram showing a second embodiment of the present invention. The second embodiment is different from the first embodiment in the following respects: A target temperature $J_p T_0$, multiplied by a constant $J_p$ in a multiplier 38 in a feedforward control system $FF_2$, is biquadrated by a biquadrator 40, to be added with a PID feedback signal $S_E$ from a feedback control system $FB_2$. In other words, assuming that x generally represents a feedforward control signal and y represents a feedback signal, the first embodiment performs arithmetic in the form of $(x+y)^4$ while the second embodiment performs arithmetic in the form of $(x^4+y)$, to produce different control signals. Since the control system is improved in responsiveness according to the present invention, the factor x is more important than y. Therefore, the difference between $(x+y)^4$ and $(x^4+y)$ is relatively small. Thus, a desired effect can be obtained also in the second embodiment too.

In the second embodiment, the output of a differential control part (multiplier 34) in a PID control system is not supplied to the feedforward control system $FF_2$ as in the first embodiment, but is, instead, differentiated by a differentiator 71 to be added with proportional and integral control outputs in an adder 72 provided in the feedback control system $FB_2$. In the feedforward control system $FF_2$, the output from a multiplier 37 is directly time-differentiated by a differentiator 43. However, all of the signals are finally added together. Thus, as obvious from comparison with FIG. 6, merely addition and differentiation are replaced in order in the aforementioned part, and the second embodiment is not substantially different from the first embodiment with respect to this modification.

D. Third Embodiment

Figure 10:
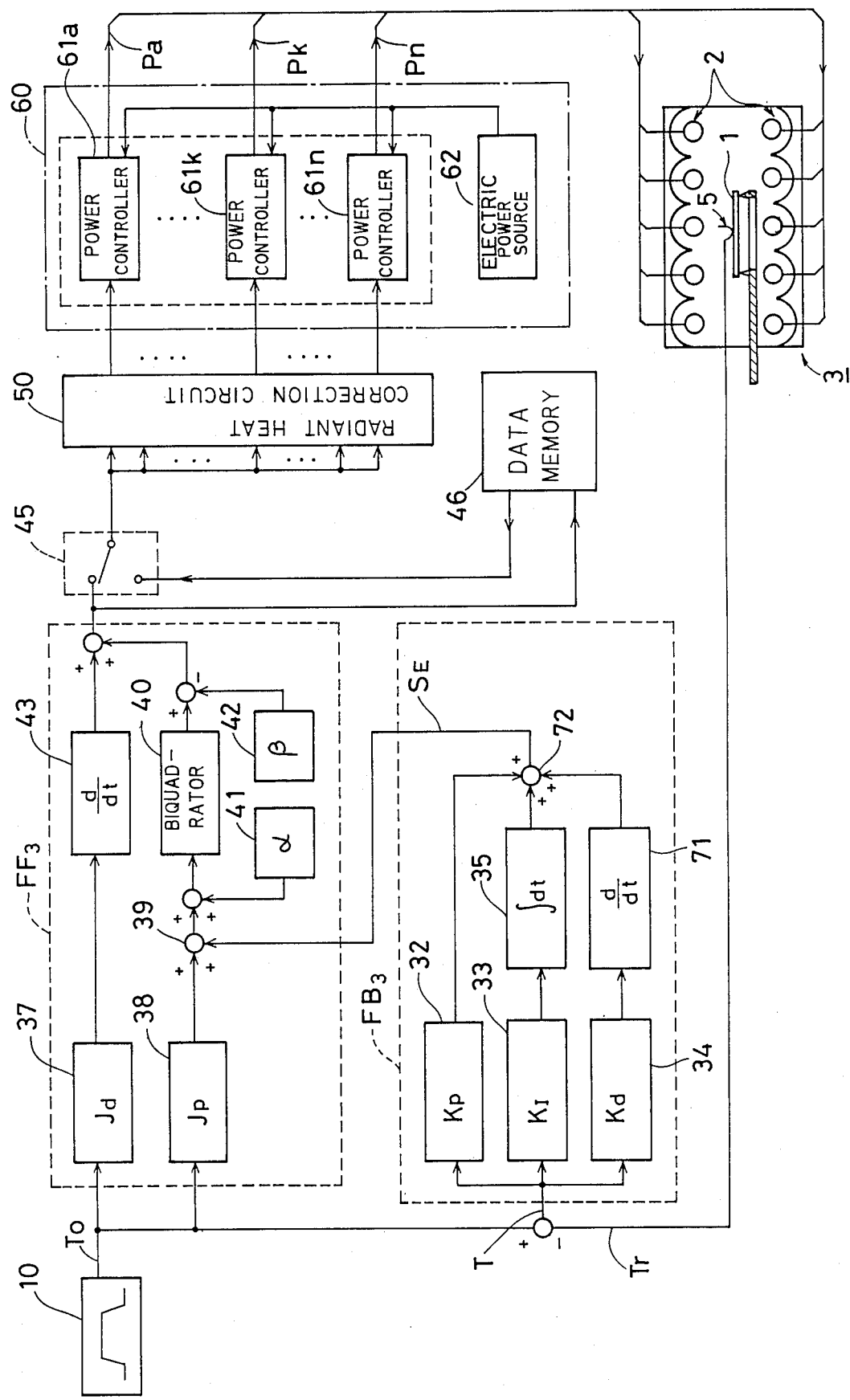
FIG. 10 is a block diagram of a heat treatment apparatus according to a third embodiment of the present invention.

FIG. 10 illustrates a third embodiment, which is similar in structure to the second embodiment in that the output from a differential control part (multiplier 34 and differentiator 71) of a PID control system is summed with proportional and integral control outputs in an adder 72 of a feedback control circuit $FB_3$. However, the third embodiment is commonly structured like the first embodiment in that biquadrative processing in a biquadrator 40 is performed on the total output from a multiplier 38 in a feedforward control system $FF_3$ and control output $S_E$ from the feedback control system $FB_3$.

Therefore, the third embodiment is an eclectic structure containing elements of the first and second embodiments. The second and third embodiments are advantageous in that a conventional PID control units can be employed.

E. Data Example

Figure 3:
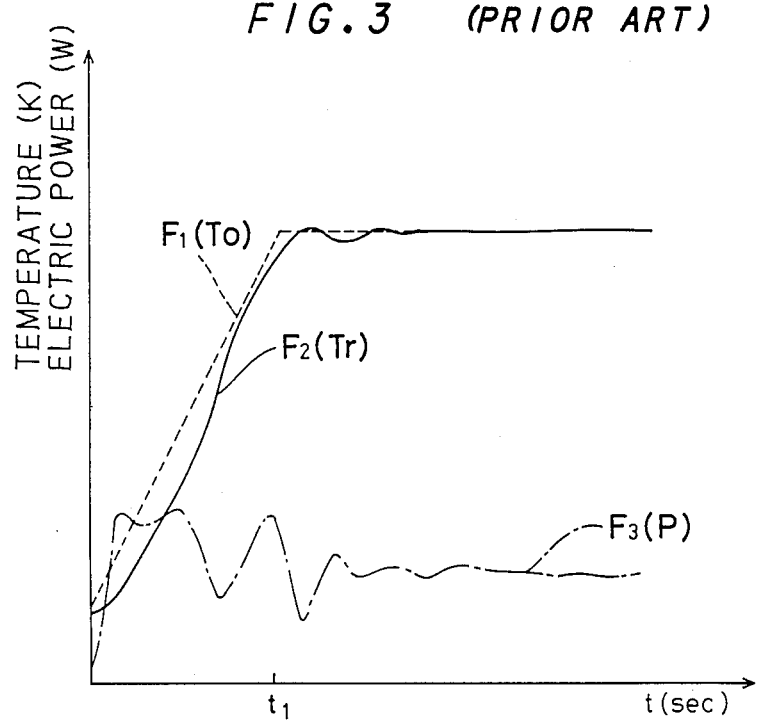
FIG. 3 is a graph showing characteristics of the prior art conventional apparatus shown in FIG. 1.
Figure 11A:
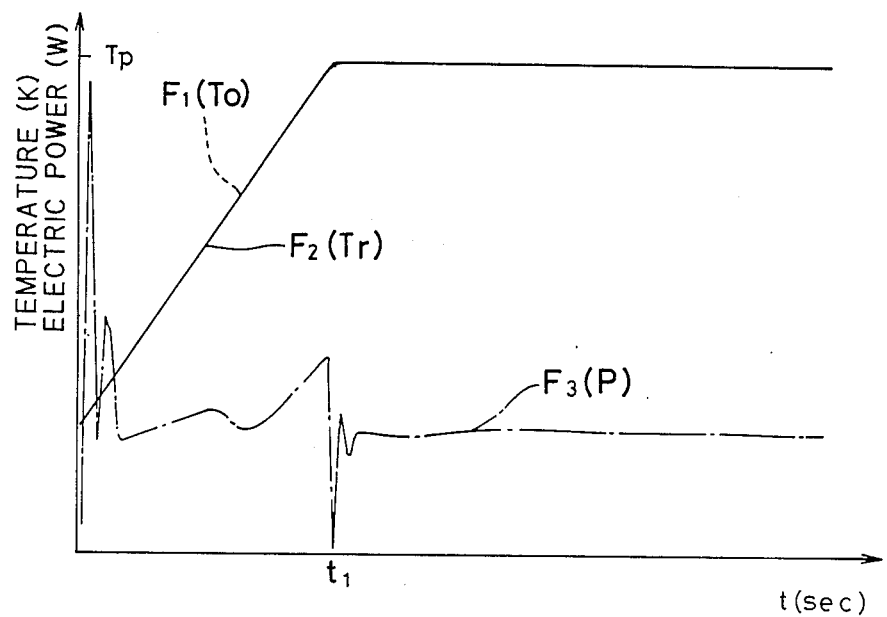
FIGS. 11A and 12A are graphs of experimental data relating to the first embodiment of the present invention.
Figure 11B:
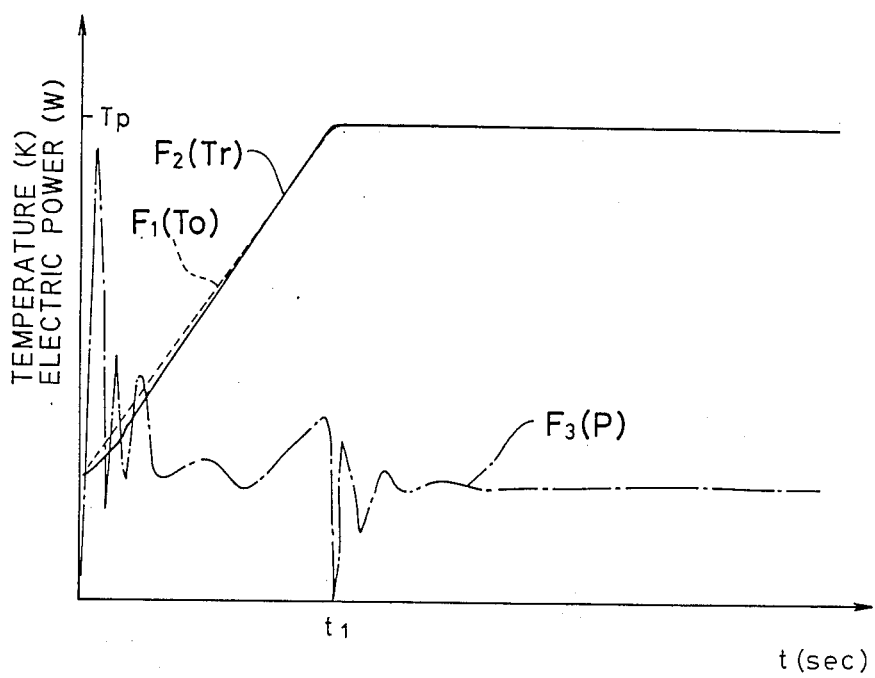
FIGS. 11B and 12B are graphs of experimental data relating to the second embodiment of the present invention.

FIGS. 11A and 11B are graphs showing experimental data of temperatures and electric power with respect to the first and second embodiments, respectively. As is obvious from a comparison of these with FIG. 3 showing those of the conventional apparatus, the temperature curves $F_2(T_r)$ of the heated objects accurately follow target temperature change curves $F_1(T_0)$ with a high-speed response in these embodiments. Particularly in FIG. 11A showing the first embodiment, the object temperature curve $F_2(T_r)$ follows the target temperature $T_0$ substantially with no error. Further, no hunting is observed in the time $t_1$ needed to reach the stationary processing temperature $T_p$ while substantially no temperature fluctuation is observed after $t_1$.

Figure 12A:
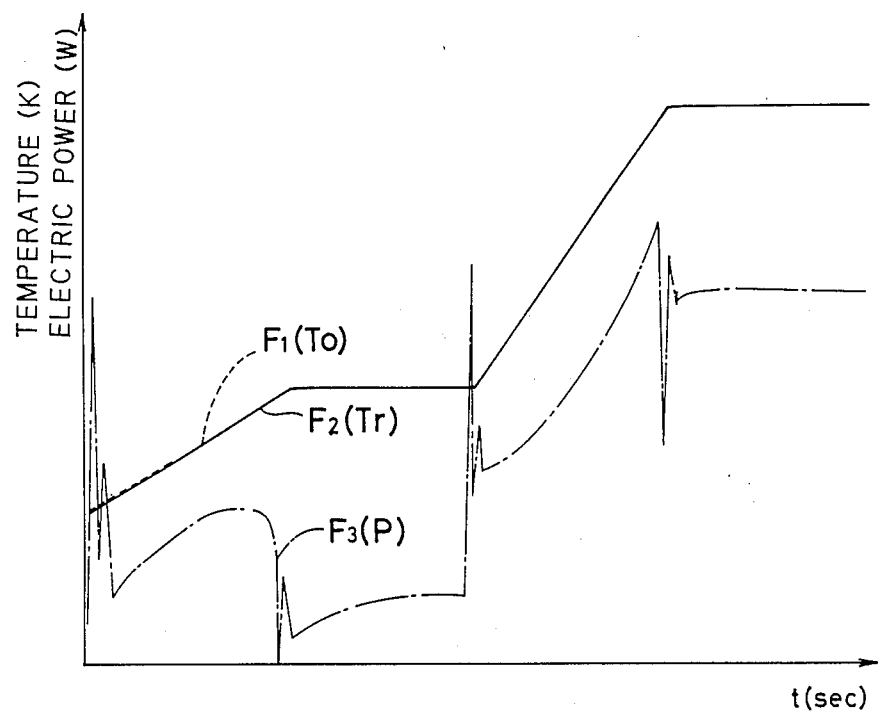
Figure 12B:
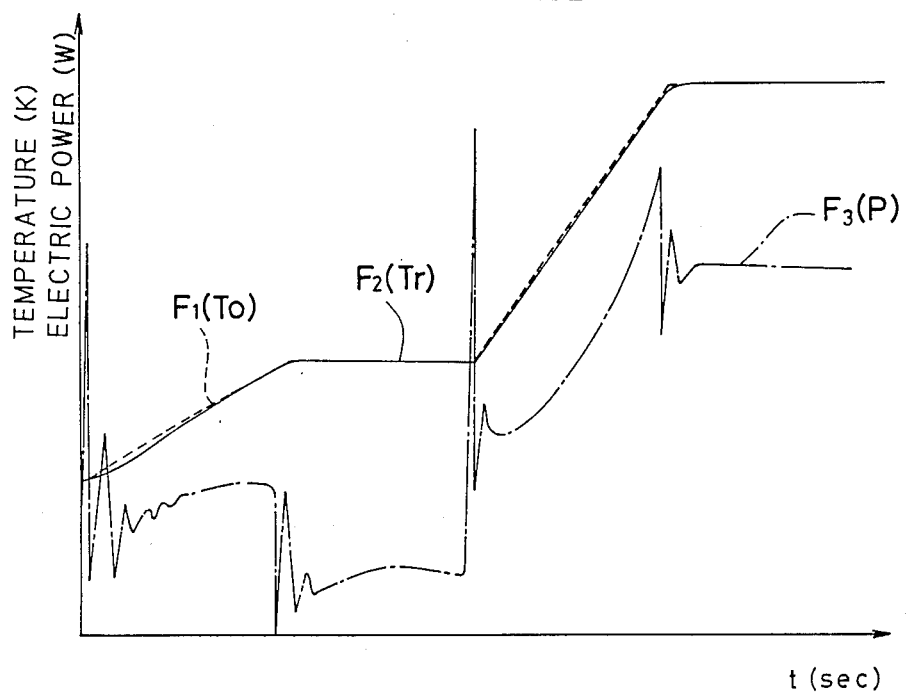

FIGS. 12A and 12B are actual graphs with respect to the first and second embodiments with target temperature change curves $F_1(T_0)$ being changed in a two-stage manner. Control exactness in the present invention can also be understood from FIGS. 12A and 12B.

The relationship between the supplied electric power P and the object temperature $T_r$ is obtained by directly employing the Stefan-Boltzmann's law in the aforementioned embodiments, while such relationships can be varied with specific situations. Partly, it originates in the fact that the Stefan-Boltzmann's law express a relationship between temperature and total radiant energy. In other words, absorption and radiation only in a specific wavelength band may be taken into consideration depending on the absorption spectrum distribution of the object. In such a case, the signal conversion rule can be modified in consideration of Planck's radiation law for obtaining radiant energy for a specific wavelength, thereby to obtain higher controllability.

Other modification factors, for example, are the influence of the ambient atmosphere in the heating furnace and outward heat dissipation from the heating furnace. The present invention is applicable not only to temperature control of an object in a closed heating furnace but also to heating of an object in an outwardly opening place, and modifications can be applied in consideration of these factors in such a case.

The input values $A_a$ to $A_n$ and the output power $P_a$ to $P_n$ of the power controllers 61a to 61n are in proportional relation (linear characteristic) with each other in the aforementioned embodiments. In the structure of the power supply unit, however, the relation between the power control value A and the supplied electric power P may be in such that the electric power P is M-th power (M: integer) of the power control value A. In this case, therefore, a multiply by N circuit, which transforms its input S to $S^N$, is employed in place of the biquadrator, where N represents an integer satisfying $N \times M = 4$.

Alternatively, the biquadrative processing may not be performed by the biquadrator, but by the use of a memory of a look-up table system previously provided with conversion data. Also, the apparatus may perform power processing other than the biquadrative one as well as polynominal conversion processing, depending on the object to be controlled.

F. Fourth Embodiment

Figure 13:
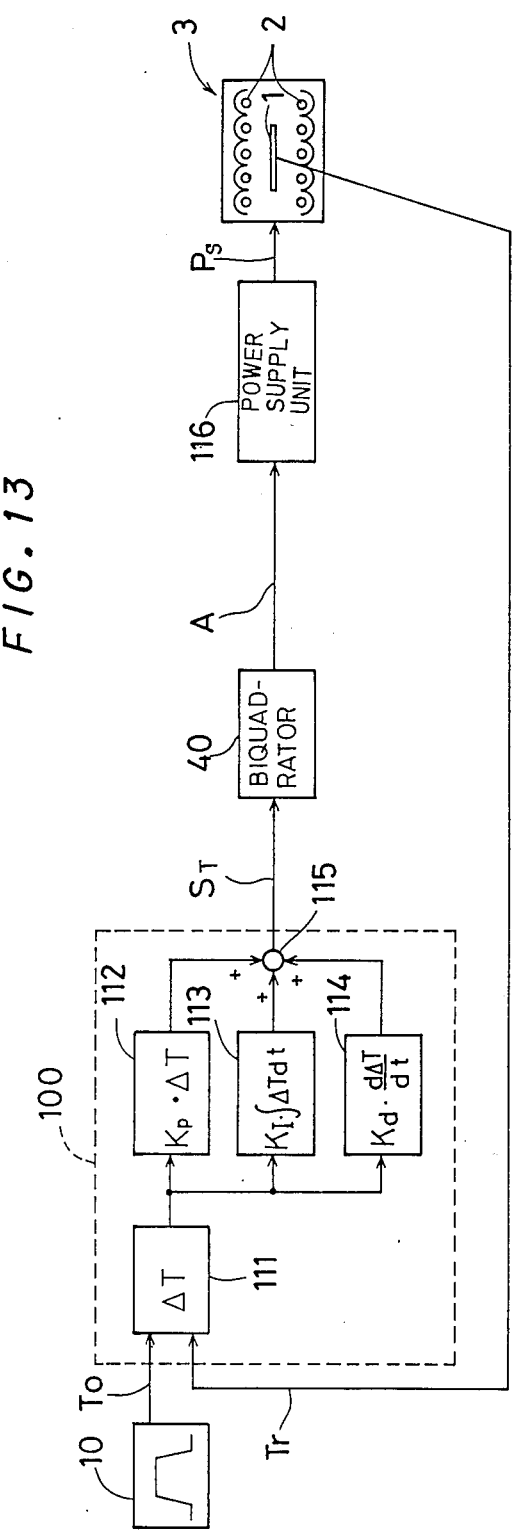
FIG. 13 is a block diagram of a heat treatment apparatus according to a fourth embodiment of the present invention.

FIG. 13 is a block diagram showing a fourth embodiment of the present invention. The fourth through seventh embodiments, as hereinafter described, comprise simpler structures than do the first to third embodiments. In other words, the present invention, in the fourth through seventh embodiments, is applied to control apparatuses performing only feedback control without performing feedforward control.

In a control apparatus as illustrated schematically in FIG. 13, a temperature control signal generator 100 is provided to perform feedback control. A subtracter 111 in the temperature control signal generator 100 obtains a deviation $\Delta T$ between a target temperature $T_0$ and an actual temperature $T_r$. The deviation T is outputted to arithmetic circuits 112, 113 and 114. The arithmetic circuit 112 performs multiplication similar to that of the multiplier 32 as shown in FIG. 9. The arithmetic circuit 113 has a function combining those of the multiplier 33 and the integrator 35 as shown in FIG. 9. The arithmetic circuit 114 has a function combining those of the multiplier 34 and the differentiator 71 as shown in FIG. 9. The signals from the arithmetic circuits 112 to 114 are added up in an adder 115, to produce a temperature control signal $S_T$.

The temperature control signal $S_T$ is biquadrated by a biquadrator 40 to produce a power control signal A, which is supplied to a power supply unit 116. Thus, the radiant heat correction circuit 50 provided in the first to third embodiments is omitted in the fourth embodiment.

Although the power supply unit 116 corresponds to the power supply unit 60 shown in FIG. 9, it is different in structure from the power supply unit 60 in that it supplies common electric power $P_S$ flow to a plurality of radiant heat sources. This is because the control apparatus in this embodiment has no independent control functions for the plurality of radiant heat sources 2 since the radiant heat correction circuit 50 is omitted. However, even if the radiant heat correction circuit 50 is omitted, the apparatus as shown in FIG. 13 is superior in control function to the conventional apparatus.

Figure 14A:
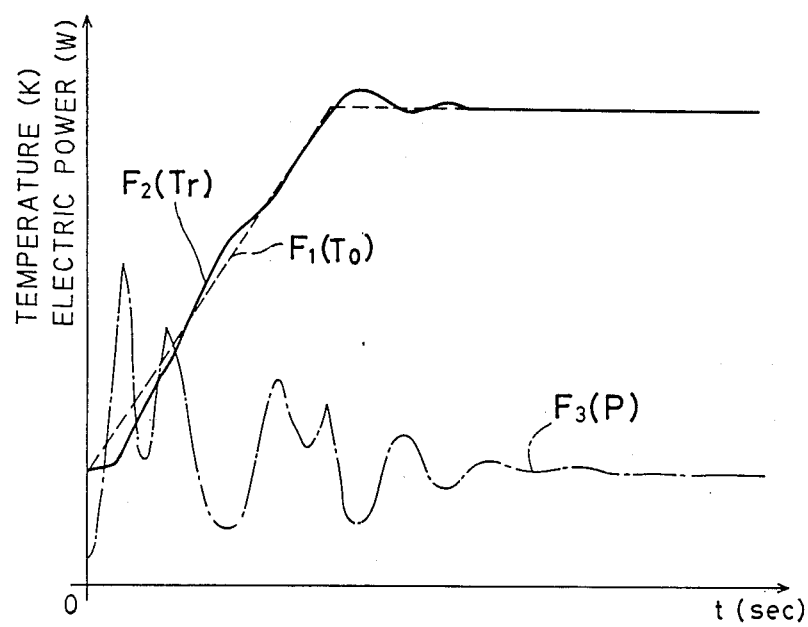
FIGS. 14A and 14B are graphs of experimental data relating to the fourth embodiment of the present invention.
Figure 14B:
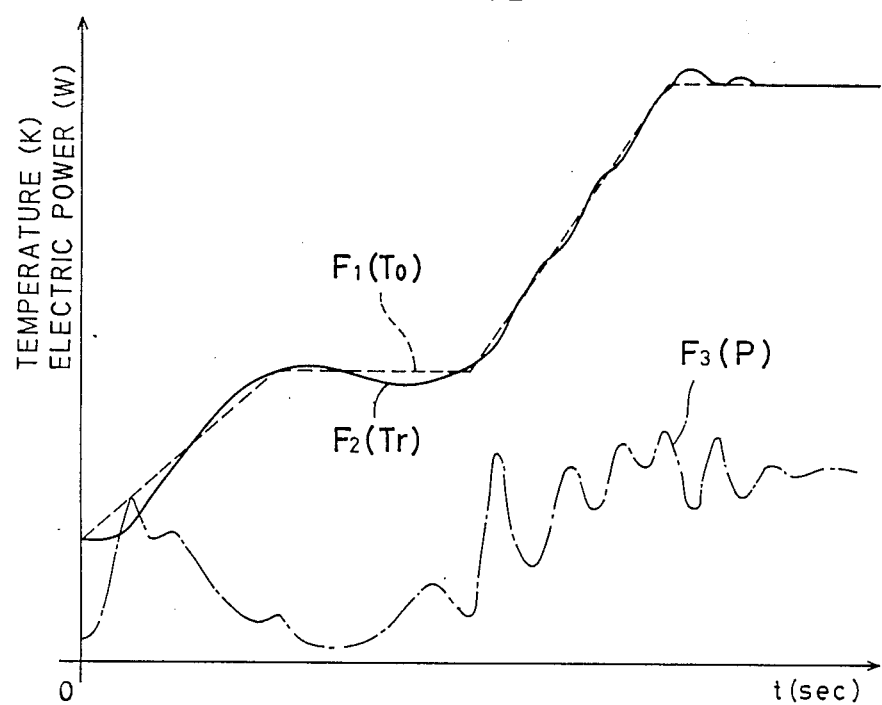

As shown in FIGS. 14A and 14B, the temperature change curve in the apparatus shown in FIG. 13 presents higher responsiveness in comparison with that shown in FIG. 3, i.e., with respect to the conventional apparatus. The apparatus as shown in FIG. 13 is different from the feedback control system $FB_1$ as shown in FIG. 6, in that a subtractor 111 is provided in the exterior of the temperature control signal generator 100 while the biquadrator 40 is shown in the exterior of the temperature control signal generator 100. However, such differences are not substantive but are related to convenience of illustration.

Figure 15:
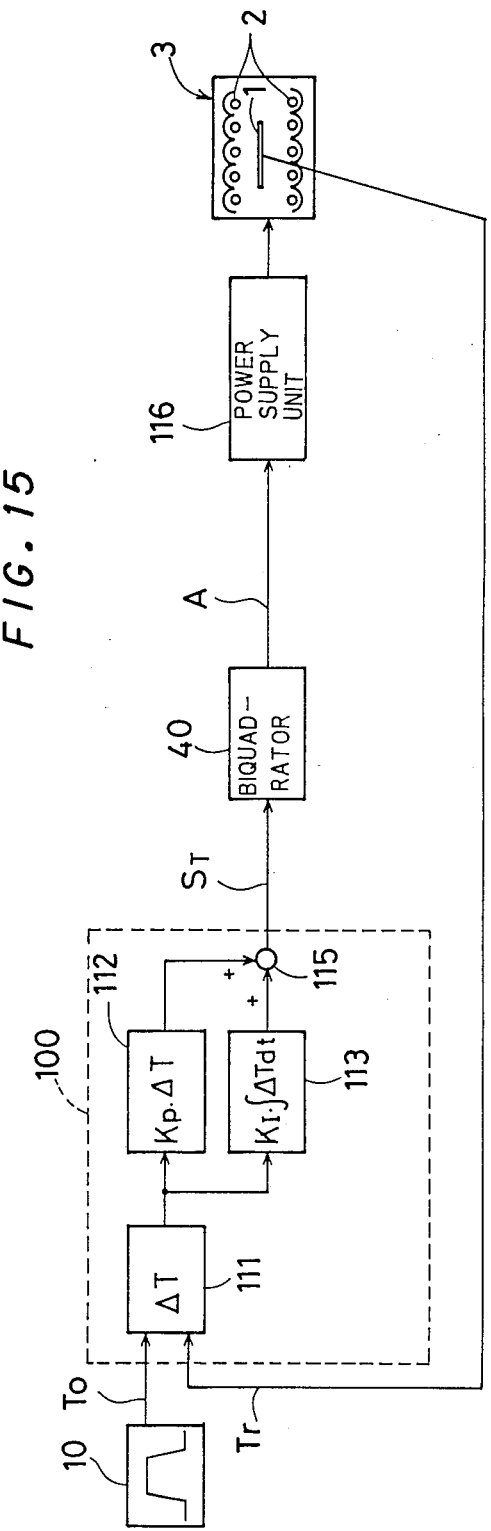
FIG. 15 is a block diagram of a modification of the fourth embodiment.

FIG. 15 illustrates a modification of the fourth embodiment. In the apparatus as shown in FIG. 15, a temperature control signal $S_T$ from a temperature control signal generator 100 has no differential control component. Such modification can be achieved by employing a circuit capable of separating differential components from the temperature control signal generator 100. In other words, the temperature control signal generator 100 employed in the fourth embodiment (FIG. 13) is adapted to output proportional, differential and integral components in total, whereby the differential component, which is not required to be biquadrated, is also biquadrated. On the other hand, the apparatus shown in FIG. 15 employs the temperature control signal generator 100 capable of separating the differential component, whereby the differential component can be separated and eliminated.

G. Fifth Embodiment

FIG. 16 is a block diagram showing a fifth embodiment, in which output from an arithmetic circuit 114 is supplied to an adder 117 provided in a subsequent stage of a biquadrator 40. Differential control output from the arithmetic circuit 114 is added to the output of the biquadrator 40, to produce a power control signal A. The fifth embodiment is similar in structure to the first embodiment as shown in FIG. 6, in that no biquadrative processing is performed on the differential control output. Therefore, the fifth embodiment can perform control in fidelity to the expression (9) on condition that only feedback control is performed.

It is to be noted that this embodiment may be modified as shown in FIG. 17, in which both of addition of a differential control component in a temperature signal generator 100 and an addition of the differential control component to the output of a biquadrator 40 are provided.

H. Sixth Embodiment

FIG. 18 illustrates a sixth embodiment of the present invention. As obvious from comparison of FIG. 18 with FIG. 14, the sixth embodiment is provided with constant setters 41 and 42. A constant $\alpha$ set in the first constant setter 41 is added to output of a temperature control signal generator 100 in an adder 118, so that the result of the addition is supplied to a biquadrator 40. The output from the biquadrator 40 is supplied to a subtracter 119, which in turn calculates the difference between the input from the biquadrator 40 and a constant $\beta$ from the constant setter 42.

Therefore, the sixth embodiment executes the correction by the constants $\alpha$ and $\beta$ as hereinabove described with reference to the first embodiment, in an apparatus performing feedback control. In the sixth embodiment, the constants $\alpha$ and $\beta$ are determined in a more strict manner, as follows: with respect to a furnace wall temperature $T_n$ of a heating furnace 3, the following expression (19) is obtained as a more rigorous expression than the expression (5):

$$I = \frac{\rho cd}{\epsilon} \cdot \frac{d\theta}{dt} + 2U + 2U_0 \tag{19}$$

where $U_0$ corresponds to radiant energy from a single susrface of the furnace wall, and is expressed as follows:

$$U_0 = T_n{}^4 \tag{20}$$

Therefore, assuming that the value of the constant $\beta$ is $2U_0$, a compensation corresponding to the third term in the right side of the expression (19) is performed. The value of $\alpha$ is determined to be an integral value obtained by assuming that an arithmetic unit 113 as shown in FIG. 18 integrates deviation T within a temperature range of 0[K] to $T_n$[K]. The apparatus as shown in FIG.

18 has higher responsiveness to heating from the temperature $T_n$ by employment of the constants $\alpha$ and $\beta$ thus determined.

Control similar to that of the apparatus as shown in FIG. 18 can also be performed in employing a temperature control signal generator 100 having a differential component separating function as shown in FIG. 19.

I. Seventh Embodiment

Figure 20:
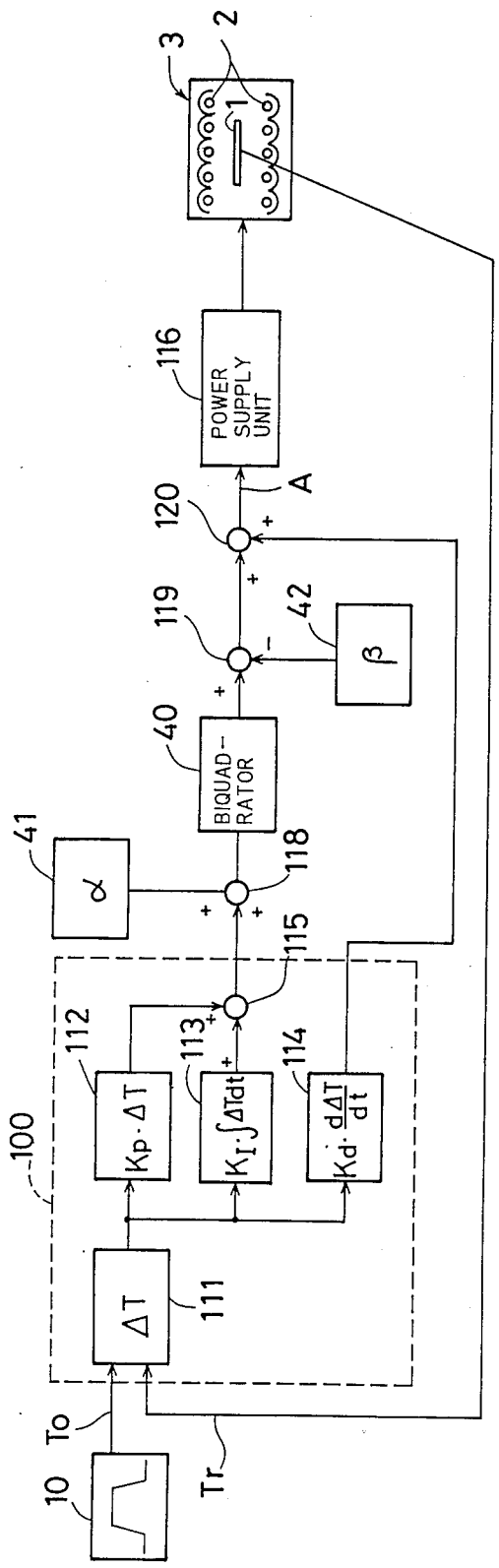
FIG. 20 is a block diagram of a heat treatment apparatus according to a seventh embodiment of the present invention.

FIG. 20 illustrates a seventh embodiment of the present invention. As obvious from FIG. 20, differential output from an arithmetic circuit 114 included in a temperature control signal generator 100 is added to a temperature control signal after biquadrative correction and correction through $\alpha$ and $\beta$ in an adder 120. Thus, the seventh embodiment performs feedback control in highest fidelity to the expression (19). The seventh embodiment is similar to the first embodiment shown in FIG. 6 in that the differential component is not biquadrated.

Figure 21A:
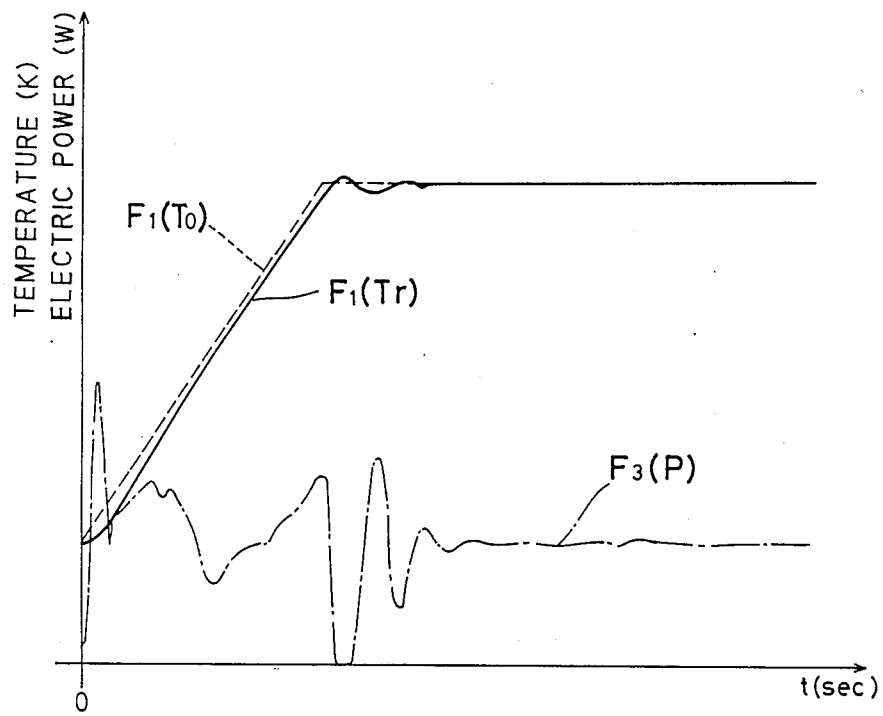
FIGS. 21A and 21B are graphs of experimental data relating to the seventh embodiment.
Figure 21B:
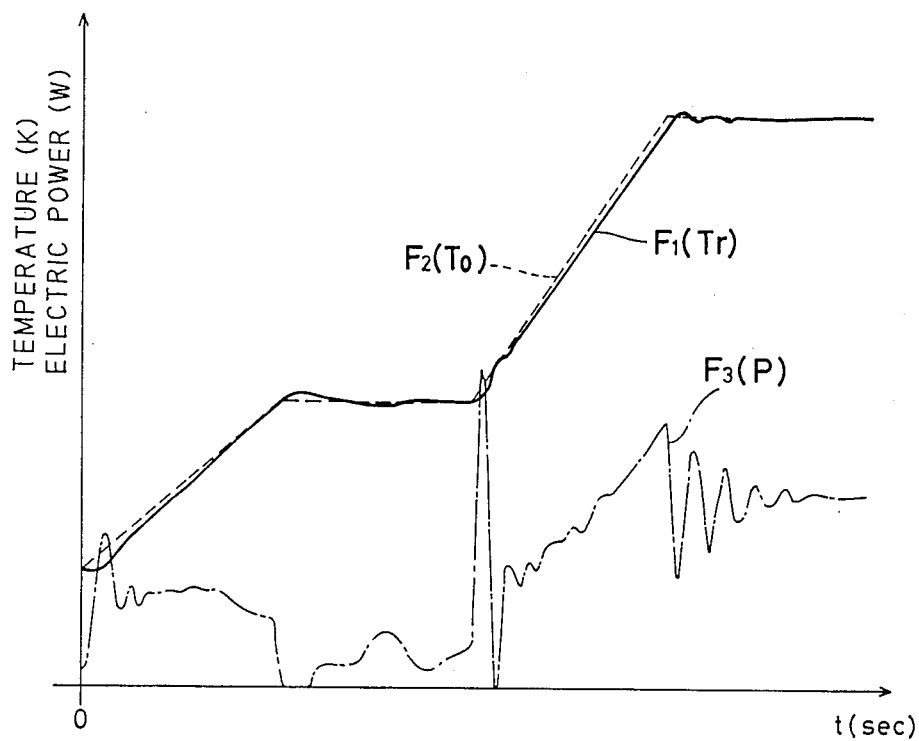

FIGS. 21A and 21B are graphs showing examples of the measured temperature response of the seventh embodiment. As is obvious from these graphs, the temperature response applying the present invention to a control system formed by only a feedback control circuit shows improvement in comparison with that of the conventional apparatus.

J. Eighth Embodiment

Figure 22:
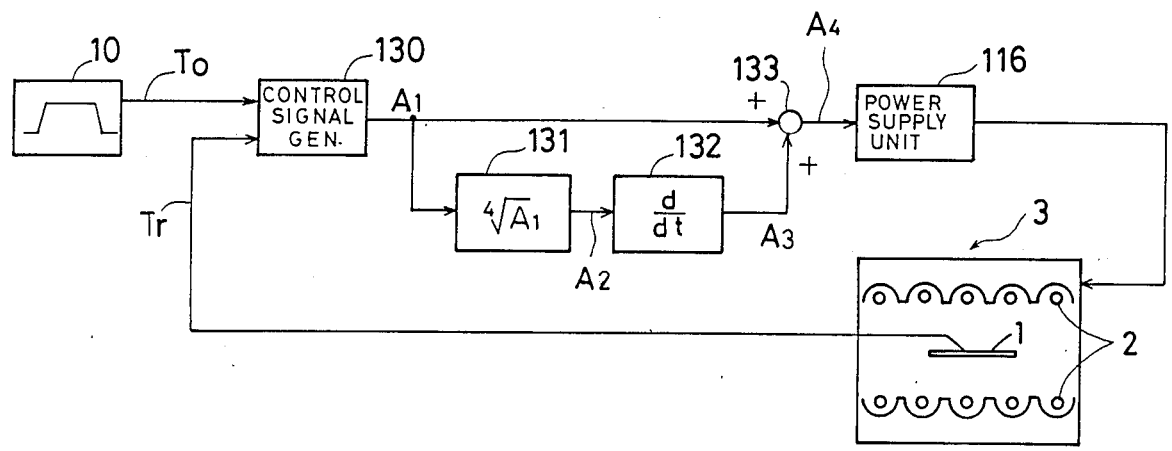
FIG. 22 is a block diagram of a heat treatment apparatus according to an eighth embodiment of the present invention.

FIG. 22 is a block diagram illustrating an eighth embodiment of the present invention. The eighth embodiment is provided with a circuit for introducing a component for changing the temperatures of radiant heat sources 2 themselves into a power control signal. Values of a target temperature $T_0$ and an actual temperature $T_r$ of a wafer 1 are inputted to a power control signal generator 130, which generates a first power control signal $A_1$ on the basis of these values. The power control signal generator 130 may be formed as a circuit including, for example, the temperature control signal generator 100 (as shown in FIG. 13) and a multiply by N circuit, i.e., a circuit for calculating $S^N$ given S as an input (not shown), where N is an integer, which is typically equal to four.

The first power control signal $A_1$ thus obtained is supplied to an N-th root calculator 131 as shown in FIG. 22. The N-th root calculator 131 is adapted to obtain the N-th root of the inputted signal $A_1$. An N-th root signal $A_2$ thus obtained is supplied to a differentiator 132 to be time-differentiated, therein, thereby to produce a second power control signal $A_3$. The first and second power control signals $A_1$ and $A_3$ are added up by an adder 133, to produce a third power control signal $A_4$ which is outputted to a power supply unit 116. If N=4, therefore, the N-th root calculator 131 has a function similar to that of the biquadrate root calculator 53k shown in FIG. 8. The differentiator 132 corresponds to the differentiator 54k shown in FIG. 8.

The reason why these circuits implement a temperature control apparatus that takes into consideration the heat quantity required for heating the radiant heat sources 2 themselves has already been described in connection with the first embodiment. Namely, the N-th root calculator 131 and the differentiator 132 (shown in FIG. 22) supply electric power corresponding to the expression (14) to the radiant heat sources 2, to provide the additional quantity of heat required for heating the radiant heat sources 2 themselves. Thus, the wafer 1 is effectively prevented from undesired influence in heating on account of the thermal capacity of the radiant heat sources 2.

Figure 23:
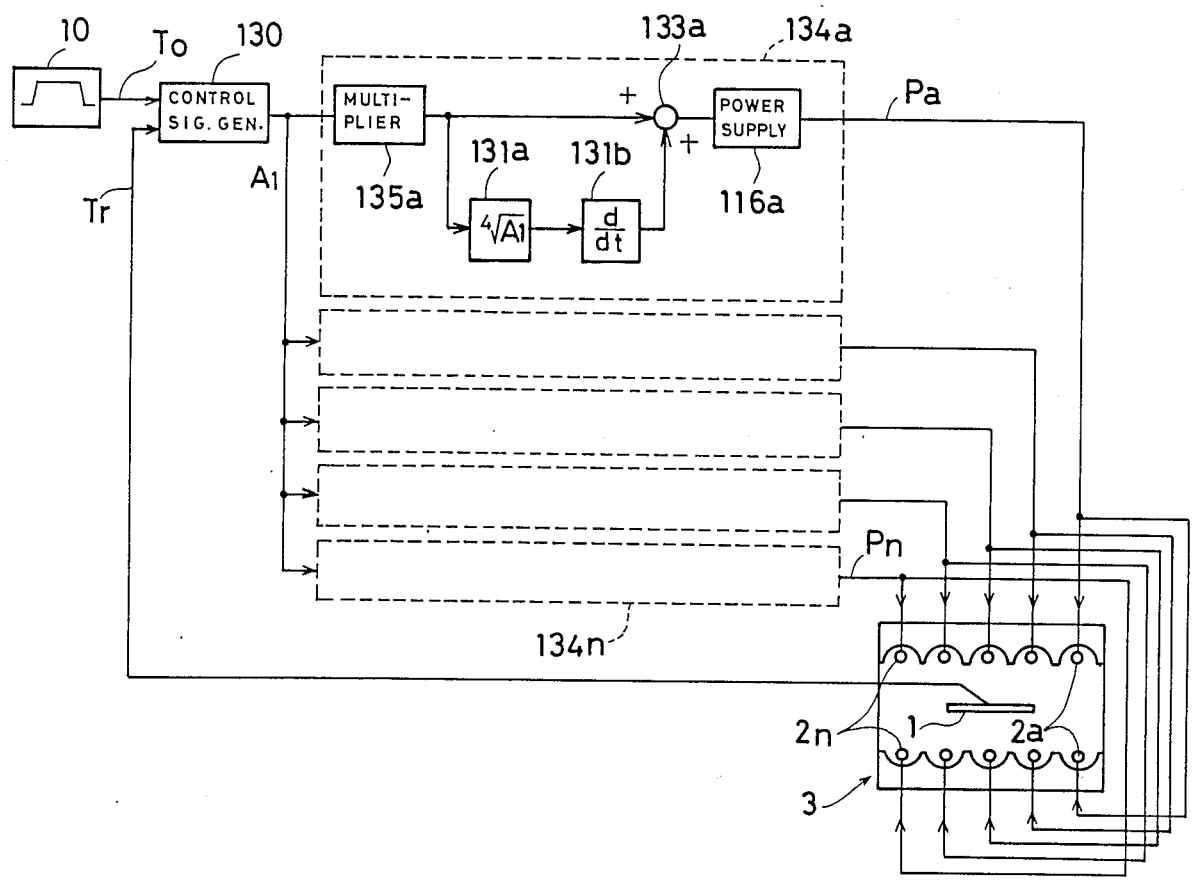
FIG. 23 is a block diaram of a modification of the eighth embodiment.

Although the value of N most preferably is N=4 in accordance with the Stefan-Boltzmann's law, another prescribed number such as N=2 or N=3 may be employed as the value N. Namely, non-linear transformation of the control signal can be employed. As shown in FIG. 23, further, temperature control circuits $134a, \ldots, 134n$ may be individually provided for a plurality of unit radiant heat sources $2a, \ldots, 2n$. For example, the temperature control circuit $134a$ is provided with a multiplier $130a$, an N-th root calculator $131a$, a differentiator $132a$ and a power supply unit $116a$. The multiplier $130a$ has a coefficient multiplying function similar to those of the multipliers $51k$ and $52k$ shown in FIG. 8. In the apparatus shown in FIG. 23, therefore, electric power $P_a, \ldots, P_n$ is separately supplied to the radiant heat sources $2a, \ldots, 2n$, respectively.

Figure 24:
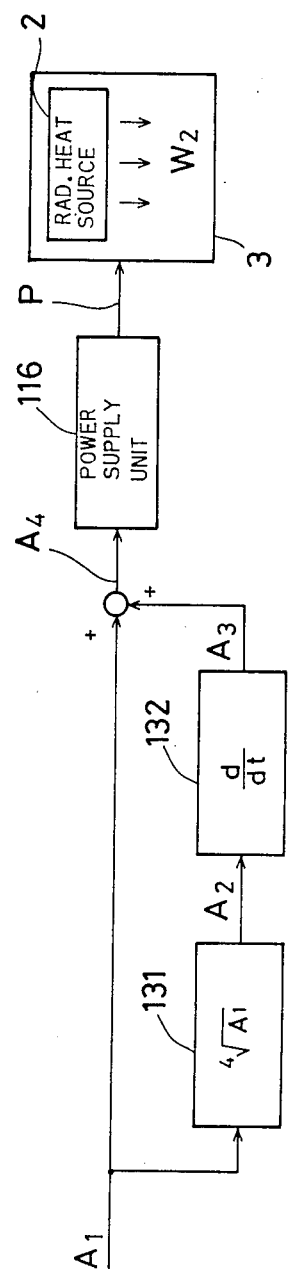
FIG. 24 is a partial block diagram of an apparatus implemented by generalizing the eighth embodiment.

A characteristic part of the eighth embodiment can be generalized as shown in FIG. 24. Referring to FIG. 24, a first power control signal $A_1$ supplied by an arbitrary circuit is summed with a second power control signal $A_3$ obtained for the purpose of heating a radiant heat source 2 itself, to produce a third power control signal $A_4$. The first power control signal $A_1$ may be the control output for a feedback control loop, as shown in FIGS. 22 and 23, or a feedforward control loop. Further, the respective embodiments as hereinabove described employ halogen lamps as the radiant heat sources 2, and hence the second power control signal $A_3$ is proportional to the electric power required for the heating filaments (resistors of the halogen lamps).

Figure 25A:
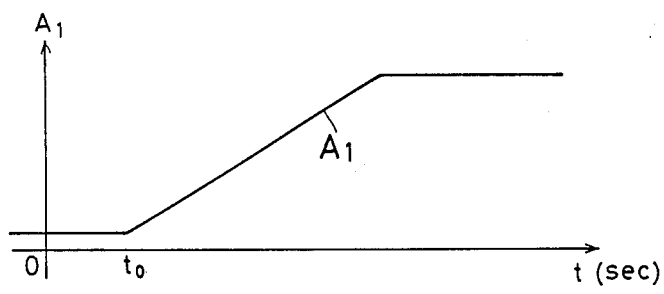
FIGS. 25A to 25F are graphs of waveforms relating to the eighth embodiment.
Figure 25B:
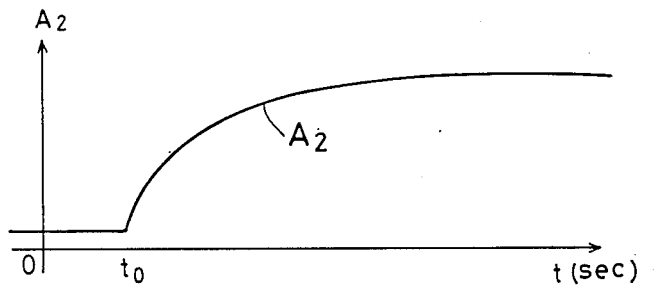
Figure 25C:
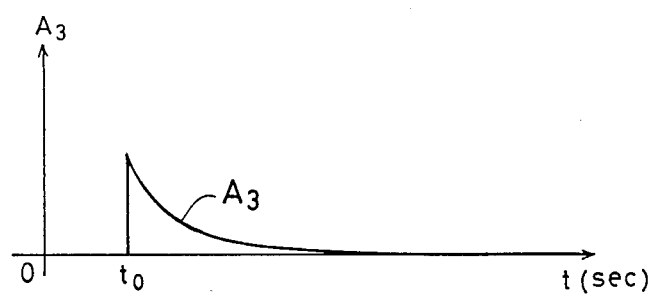
Figure 25D:
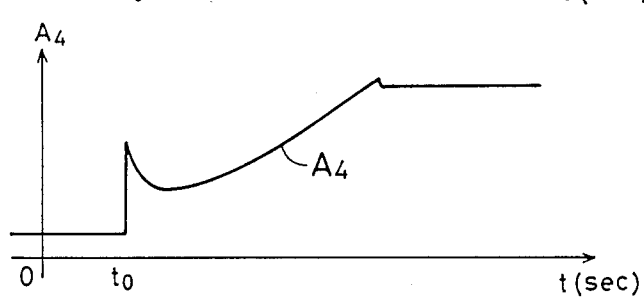
Figure 25E:
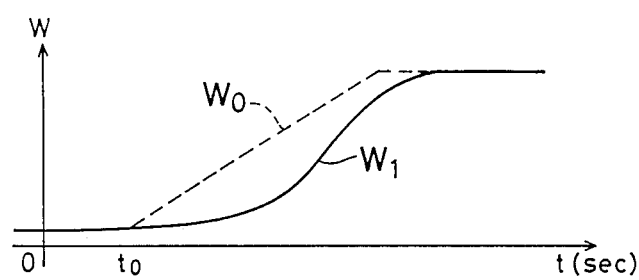
Figure 25F:
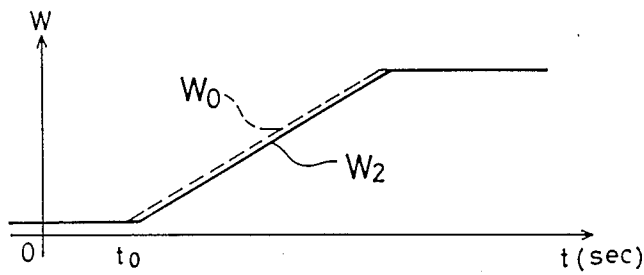

FIGS. 25A to 25D illustrate waveforms of respective signals generated by the embodiment shown in FIG. 24. FIG. 25E depicts the time change of radiant energy $W_1$ from the radiant heat source 2 in a case with directly outputting of the first power control signal $A_1$ to the power supply unit 116, as in the conventional apparatus. FIG. 25F depicts the time change of radiant energy $W_2$ in the embodiment shown in FIG. 24. As is obvious from FIG. 25E, the actual radiant energy $W_1$ rises but with a lag to the time change of radiant energy $W_0$ set by an operator in the conventional apparatus, due to the thermal capacity of the radiant heat source 2 itself. According to the eighth embodiment of the present invention, on the other hand, the first power control signal $A_1$ (FIG. 25A) and the second power control signal (FIG. 25C) are summed to produce the third power control signal $A_4$ (FIG. 25D). The second control signal $A_3$ is at a high level in the vicinity of a heating start time $t_0$ and gradually attenuates with the lapse of the time t. Thus, insufficiency of the radiant energy is compensated for in the vicinity of the heating start time, and the radiant energy $W_2$ is increased in correspondence with the increase of the radiant energy $W_0$ set by the operator (see FIG. 25F).

Figure 26:
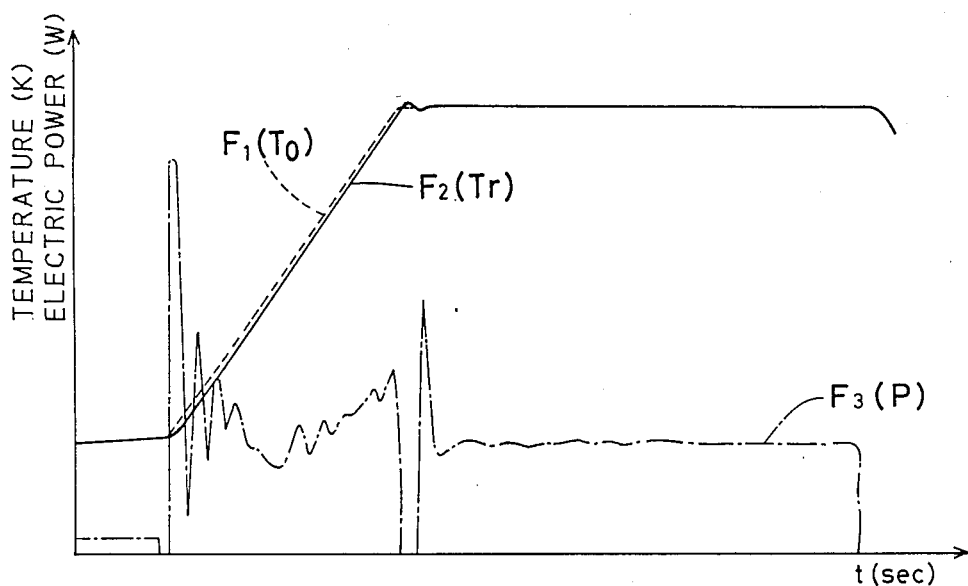
FIG. 26 is a graph of experimental data relating to the eighth embodiment.
Figure 27:
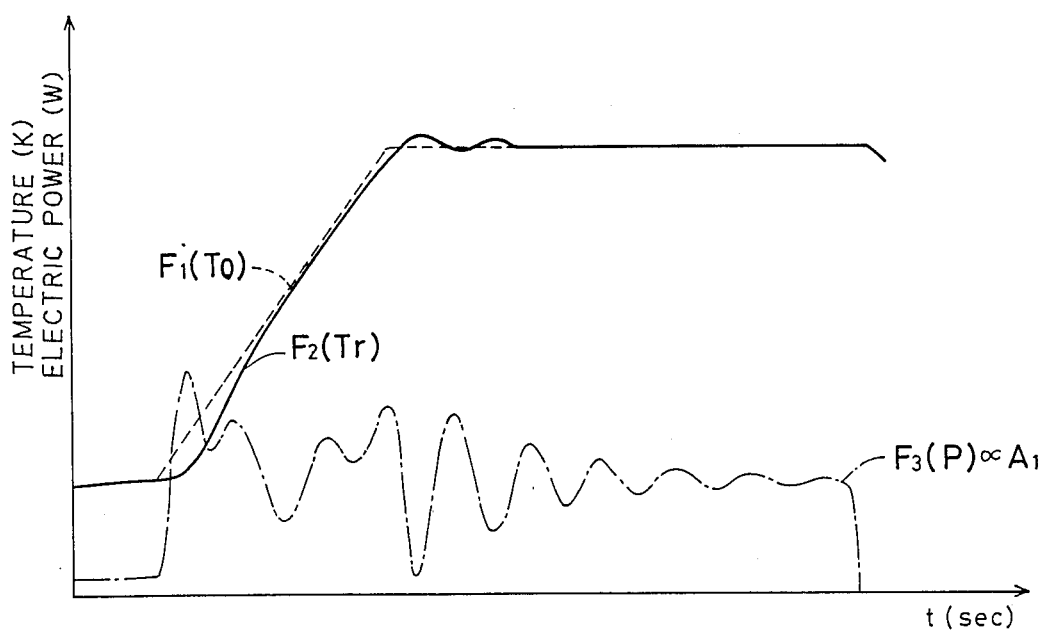
FIG. 27 is a graph of experimental data relaing to a prior art conventional apparatus.

FIG. 26 illustrates actual data of temperature change and electric power change in the eighth embodiment. As is obvious from a comparison of FIG. 26 with FIG. 27 which shows actual data in the conventional apparatus, the temperature response of the wafer 1 is remarkably improved in the eighth embodiment.

K. Ninth Embodiment

FIG. 28 is a partial block diagram showing a ninth embodiment of the present invention. FIGS. 29A to 29D illustrate waveforms of respective signals in the ninth embodiment. The ninth embodiment provides a temperature control signal $S_T$ proportional to the N-th root of radiant energy W. The temperature control signal $S_T$ is raised to the N-th power by the N-times multiplier 141, to obtain a first power control signal $A_5$. Further, the temperature control signal $S_T$ is time-differentiated at differentiator 142 to obtain a second power control signal $A_6$. The first and second power control signals $A_5$ and $A_6$ are composed by an addition in an adder 143, to obtain a third power control signal $A_7$ which is supplied to a power supply unit 116.

While the apparatus shown in FIG. 24 is supplied with the power control signal $A_1$ as its input, the apparatus shown in FIG. 28 is supplied with the temperature control signal $S_T$. However, so far as the temperature control signal $S_T$ corresponding to the N-th root of the power control signals $A_1$ is supplied, these apparatuses are substantially equivalent to each other and perform power supply adjustments corresponding to the expression (15). In other words, the apparatuses of FIGS. 24 and FIG. 28 are different each other only in their respective order of signal processing.

L. Advantages of the Embodiments

The various embodiments of the present invention as hereinabove described have the following advantages:

Power supply adjustment is performed on the basis of the relation between the value of the radiant energy from the radiant heat sources and the temperature of the object to be heated, thereby to improve responsiveness and correctness in the temperature control of the object. The responsiveness is further improved in the first to third embodiments, since the present invention is applied to a control apparatus including the feedforward control system which is highly responsive. However, the fourth to seventh embodiments formed by the feedback control systems also have similar advantages.

In addition, correction through the constants $\alpha$ and $\beta$ is performed on the control signal, thereby eliminating error in the course of heating the object from a finite temperature. Also the influence of the thermal capacity of the radiant heat sources can be eliminated by compensating for the quantity of heat required for heating the radiant heat sources themselves.

M. Modification

Although a solid such as a wafer is merely heated in the embodiments hereinabove described, the present invention can be applied to an apparatus for heating a solid to melt the same. In this case, the electric power to be supplied may be increased at the melting point by an amount corresponding to the latent heat of melting.

The present invention is applicable not only to radiant heat sources radiating electromagnetic waves in an optical region such as the aforementioned halogen lamps, but also to other heat sources for heating an object, e.g., by microwaves. In such a case, a relationship between the electric power supplied to a microwave oscillator and the temperature of the object is obtained, to form a control system on the basis of the relationship.

Further, the present invention is applicable not only to heat treatment of an object, but to temperature fixing of an object under several treatments e.g., a chemical treatment. For example, the present invention can be applied to temperature control in a thermostatic vessel. Needless to say, the circuits in the embodiments may be constructed by high-speed computers.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A temperature control method for controlling the supply of electric power from an electric power supply means to radiant heater means, to heat an object by radiant heat generated from said radiant heater means, thereby to control the instantaneous temperature $\theta$ of said object to follow a prescribed instantaneous target temperature level $T_o$ over time t, said temperature control method comprising the steps of:

obtaining a relationship between electric power P supplied to said radiant heater means and an instantaneous temperature $\theta$ of said object, on the basis of Stefan-Boltzmann's law with respect to temperature and radiant energy, according to $U = \sigma \theta^4$, wherein U is the radiant energy per unit area of a black body, $\theta$ is the absolute temperature of said black body and $\sigma$ is a constant, and approximating $\theta$ by $T_o$;

generating a temperature control signal reponsive to said prescribed target temperature level;

converting said temperature control signal into a power control signal for controlling said electric power supplied to said radiant heater means, using a conversion rule determined in accordance with said relationship; and supplying said electric power from said power supply means to said radiant heater means on the basis of said power supply signal, thereby to controllably heat said object by said radiant energy from said radiant heater means.

2. A temperature control method in accordance with claim 1, wherein:

said conversion step includes the step of mathematically raising a value of said temperature control signal by an exponential power.

3. A temperature control method in accordance with claim 2, wherein:

said raising to an exponent step is performed after adding a prescribed first constant to said temperature control signal; and said power control signal is obtained by subtracting a prescribed second constant from the result of said raising to an exponent step.

4. A temperature control method in accordance with claim 1, wherein:

said temperature control signal includes a feedforward of an open loop control signal having a time-differential component of said target temperature.

5. A temperature control method in accordance with claim 1, further comprising the step of:

detecting the actual temperature of said object at a surface of said object or in the vicinity thereof; and said temperature control signal includes a feedback control signal responsive to difference between said target temperature and said actual temperature of said object.

6. A temperature control method in accordance with claim 1, wherein:

said conversion step includes a step of correcting said power control signal in response to a temperature change of said radiant heater means, to supply a correction, performed by adding a signal proportional to a time-differentiation of a root of said power control signal, to ensure that a corrected power control signal is provided to said power supply means.

7. A temperature control apparatus, for heating an object so as to control the temperature of said object to follow a prescribed target temperature level, said temperature control apparatus comprising:

temperature control signal generator means for generating a temperature control signal responsive to said target temperature;

radiant heater means for heating said object by radiant energy;

power supply means for supplying electric power to said radiant heater means;

signal conversion means for converting said temperature control signal into a power control signal for controlling electric power to be supplied to said radiant heater means by using a conversion rule obtained in accordance with a relationship between electric power supplied to said radiant heater means and the temperature of said object, said relationship being determined on the basis of Stefan-Boltzmann's law with respect to the absolute temperature of and radiant energy radiated by a black body according to $U = \sigma \theta^4$, wherein U is the radiant energy per unit area of a black body, $\theta$ is the absolute temperature of said black body and $\sigma$ is a constant; and transmission means for transmitting said power control signal to said power supply means.

8. A temperature control apparatus in accordance with claim 7, wherein:

said conversion means includes means for mathematically raising a value of said temperature control signal by an exponential power.

9. A temperature control apparatus in accordance with claim 8, wherein:

said conversion means includes (a) adder means for adding a first predetermined constant $\alpha$ to said temperature control signal, (b) means for raising an output of said adder means to an exponent, and (c) subtractor means for subtracting a second predetermined constant $\beta$ from an output of said power raising means.

10. A temperature control apparatus in accordance with claim 7, wherein:

said temperature control signal generator means includes means for providing feedforward of an open loop control signal having a time-differential component of said target temperature.

11. A temperature control apparatus in accordance with claim 7, further comprising:

temperature detector means for detecting the temperature of said object, provided on the surface of said object or in the vicinity thereof; and wherein said temperature control signal generator means includes a feedback control circuit to generate a feedback control signal responsive to a difference between said target temperature and an actual temperature of said object detected by said temperature detector means.

12. A temperature control apparatus in accordance with claim 7, wherein:

said signal conversion means includes correction means for correcting said power control signal in response to a temperature change of said radiant heater means itself to generate a corrected power control signal.

13. A temperature control apparatus in accordance with claim 12, wherein:

said correction means includes means for obtaining a root signal corresponding to an exponential power less than 1.0 of said power control signal, differentiator means for time-differentiating said root signal, and adder means for summing said power control signal with a signal proportional to an output of said differentiator means to thereby generate said corrected power control signal.

14. A temperature control method for supplying electric power from electric power supply means to radiant heater means to heat an object by radiant energy generated from said radiant heater means to thereby control the temperature of said object to follow a prescribed target temperature level, said temperature control method comprising the steps of:

generating a first power control signal indicating an electric power value required to generate said radiant energy at a rate related to said target temperature of said object through Stefan-Boltzmann's law $U = \sigma \theta^4$, wherein U is the radiant energy radiated per unit area of a black body, $\theta$ is the absolute temperature of the radiating black body and $\sigma$ is a constant;

generating a second power control signal responsive to a temperature change of said radiant heater means itself;

composing said first and second power control signals to generate a third power control signal for controlling electric power to be supplied to said radiant heater means; and supplying said electric power from said power supply means to said radiant heater means on the basis of said third power supply signal, thereby to heat said object by radiant energy from said radiant heater means.

15. A temperature control method in accordance with claim 14, wherein:

said second power control signal is proportional to a time differentiation of a root of said first power control signal.

16. A temperature control method in accordance with claim 14, wherein:

said first power control signal is obtained by raising to an exponent a temperature control signal indicating the temperature of said object, and said second power control signal is proportional to a time differentiation of said temperature control signal.

17. A temperature control apparatus for heating an object to control the temperature of said object to follow a prescribed target temperature level, said temperature control apparatus comprising:

radiant heater means for heating said object by radiant energy;

power supply means for supplying electric power to said radiant heater means;

first power control signal generator means for generating a first power control signal indicating an electric power value required to generate said radiant energy at a rate related to said target temperature of said object through Stefan-Boltzmann's law $U = \sigma \theta^4$, wherein U is the radiant energy radiated per unit area of a black body, $\theta$ is the absolute temperature of the radiating black body and $\sigma$ is a constant;

second power control signal generator means for generating a second power control signal responsive to a temperature change of said radiant heater means itself;

composer means for composing said first and second power control signals to generate a third power control signal for controlling electric power to be supplied to said radiant heater means; and transmission means for transmitting said third power supply signal to said power supply means.

18. A temperature control apparatus in accordance with claim 17, wherein:
said second power control signal is proportional to a time differentiation of a root of said first power control signal.

19. A temperature control apparatus in accordance with claim 17, wherein:
said first power control signal generator means is adapted to obtain said first power control signal by raising to an exponent a temperature control signal indicating the temperature of said object; and said second power control signal generator means is adapted to generate said second power control signal on the basis of a time differentiation of said temperature control signal.

* * * * *